US012657504B2

(12) United States Patent　　(10) Patent No.:　US 12,657,504 B2
Lechner　　　　　　　　　　　　 (45) Date of Patent:　　Jun. 16, 2026

(54) METHOD AND APPARATUS FOR MACHINE LEARNING USING A QUANTUM SYSTEM

(71) Applicant: PARITY QUANTUM COMPUTING GMBH, Innsbruck (AT)

(72) Inventor: Wolfgang Lechner, Rum (AT)

(73) Assignee: PARITY QUANTUM COMPUTING GMBH, Innsbruck (AT)

( * ) Notice: Subject to any disclaimer, the term of this patent is extended or adjusted under 35 U.S.C. 154(b) by 662 days.

(21) Appl. No.: 18/036,976

(22) PCT Filed: Oct. 19, 2020

(86) PCT No.: PCT/EP2020/082705
§ 371 (c)(1),
(2) Date: May 15, 2023

(87) PCT Pub. No.: WO2022/106003
PCT Pub. Date: May 27, 2022

(65) Prior Publication Data
US 2023/0419154 A1　　Dec. 28, 2023

(51) Int. Cl.
G06N 10/60　　　(2022.01)
G06N 3/08　　　　(2023.01)
G06N 10/70　　　(2022.01)

(52) U.S. Cl.
CPC .............. G06N 10/60 (2022.01); G06N 3/08 (2013.01); G06N 10/70 (2022.01)

(58) Field of Classification Search
CPC .......... G06N 10/60; G06N 3/08; G06N 10/70; G06N 3/047; G06N 3/0495; G06N 3/0499; G06N 10/00; G06N 3/088
See application file for complete search history.

(56) References Cited

U.S. PATENT DOCUMENTS

2017/0300808 A1　　10/2017　Ronagh et al.

FOREIGN PATENT DOCUMENTS

JP　　　　2019514135 A　　5/2019
WO　　WO-2020156680 A1 *　8/2020　............. G06N 10/40

OTHER PUBLICATIONS

Adcock et al., Advances in quantum machine learning, 2015, (Year: 2015).*

(Continued)

*Primary Examiner* — Tyler J Torgrimson
(74) *Attorney, Agent, or Firm* — Meunier Carlin & Curfman LLC

(57)　　　　　　ABSTRACT

A method for machine learning using a quantum system is provided. A neural network is associated with the quantum system. The method includes initializing the quantum system in an initial quantum state, and, for each configuration of a number of configurations taken from the training data set, encoding the configuration in input qubits that form a subset of the set of primary qubits, and, for each configuration of the number of configurations, performing N rounds of operations. Each round includes applying a sequence of unitary operators acting on at least a portion of the quantum system, and performing a measurement of at least a portion of the quantum system. The method includes performing a measurement of one or more ancillary qubits. The method includes, based at least on the measurement of the one or more ancillary qubits, determining at least one weight of a connection of the plurality of connections.

21 Claims, 9 Drawing Sheets

(56)  References Cited

OTHER PUBLICATIONS

Rocutto et al., Quantum Semantic Learning by Reverse Annealing an Adiabatic Quantum Computer, 2020, (Year: 2020).*
International Search Report and Written Opinion in Application No. PCT/EP2020/082705, mailed Aug. 4, 2021, 15 pages.
Adcock, Jeremy, et al: "Advances in quantum machine learning", CORR (ARXIV), vol. 1512.02900vl, Dec. 9, 2015 (Dec. 9, 2015), pp. 1-38.
Rocutto, Lorenzo et al: "Quantum Semantic Learning by Reverse Annealing an Adiabatic Quantum Computer", arxiv.org, Cornell University Library, 201 Olin Library Cornell University Ithaca, NY 14853, Mar. 25, 2020 (Mar. 25, 2020).

* cited by examiner

METHOD AND APPARATUS FOR MACHINE LEARNING USING A QUANTUM SYSTEM

Embodiments described herein relate to apparatuses and methods for performing a quantum computation, more specifically apparatuses and methods for computing solutions to machine learning problems using a quantum system, more specifically a quantum system including a plurality of quantum bits (qubits).

BACKGROUND

Neural networks are computing systems used in the field of artificial intelligence for solving difficult computational tasks. Neural networks are inspired by biological neurons, e.g. neurons in an animal brain. Neural networks are examples of machine learning systems, where a program or computing system can change as it learns to solve a problem. A neural network can be trained and improved with each example which is provided to the neural network.

A neural network includes nodes and connections between the nodes. A neural network may be designed such that the neural network includes several layers, each layer including a respective set of nodes. There can be connections between the nodes of adjacent layers, while there may be no connections between nodes of non-adjacent layers. In many cases, the number of nodes, layers and connections can be very large.

Each connection of a neural network has a weight, e.g. a real number associated with the connection in question. A weight can be regarded as a strength of an interaction or signal between two nodes. The weights can be unknown a priori, and a task of a machine learning problem may be to determine, or learn, suitable weights. In many cases, the neural network may be subject to additional conditions or constraints, and a task of a machine learning problem may be to determine suitable weights of the connections such that a maximal amount of these conditions are met, at least approximately.

The task of computing the weights of a neural network can be very complex and time-consuming, especially as the size of the neural network grows. While several methods have been proposed for solving machine learning problems, for some problems the runtime of even the best available methods is exponentially long, making these methods intractable for large neural networks.

Therefore, there is a need for improved methods and devices for performing machine learning.

SUMMARY

According to an embodiment, a method for machine learning using a quantum system is provided. The method includes providing a quantum system comprising a set of primary qubits and a set of ancillary qubits. A neural network is associated with the quantum system. The neural network includes a first set of nodes and a second set of nodes. The neural network includes a plurality of connections between the first set of nodes and the second set of nodes, each connection having a weight. The neural network includes a training data set comprising a plurality of configurations for the first set of nodes. Each connection of the plurality of connections is both associated with a primary qubit and with an ancillary qubit. The method includes initializing the quantum system in an initial quantum state. The method includes, for each configuration of a number of configurations taken from the training data set, encoding the configuration in input qubits that form a subset of the set of primary qubits. The method includes, for each configuration of the number of configurations, performing N rounds of operations. Each round includes applying a sequence of unitary operators acting on at least a portion of the quantum system, and performing a measurement of at least a portion of the quantum system. The method includes performing a measurement of one or more ancillary qubits. The method includes, based at least on the measurement of the one or more ancillary qubits, determining at least one weight of a connection of the plurality of connections.

According to a further embodiment, a method for machine learning using a quantum system is provided. The method includes providing a quantum system comprising a set of primary qubits and a set of ancillary qubits. A neural network is associated with the quantum system. The neural network includes a first set of nodes, a second set of nodes and a plurality of connections between the first set of nodes and the second set of nodes, each connection having a weight. The neural network includes a training data set comprising a plurality of configurations for the first set of nodes. Each connection of the plurality of connections is both associated with a primary qubit and with an ancillary qubit. The method further includes initializing the quantum system in an initial quantum state. The method further includes, for each configuration in a set sampled from the training data set:

encoding the configuration in input qubits that form a subset of the set of primary qubits;

performing a plurality of first rounds of operations, wherein each first round comprises: (a1) applying a sequence of unitary operators selected from a first family of unitary operators; and (a2) performing a measurement of at least a portion of the quantum system; and performing a plurality of second rounds of operations, wherein each second round comprises: (b1) applying a sequence of unitary operators selected from a second family of unitary operators, wherein the second family of unitary operators is different from the first family of unitary operators; and (b2) performing a measurement of at least a portion of the quantum system;

The method further includes performing a measurement of one or more ancillary qubits and, based at least on the measurement of the one or more ancillary qubits, determining at least one weight of a connection of the plurality of connections.

According to a further embodiment, an apparatus for performing machine learning using a quantum system is provided. The apparatus includes a quantum system comprising a set of primary qubits and a set of ancillary qubits as described herein. A neural network is associated with the quantum system. The neural network includes a first set of nodes, a second set of nodes, and a plurality of connections between the first set of nodes and the second set of nodes, each connection having a weight. The neural network includes a training data set comprising a plurality of configurations for the first set of nodes. Each connection of the plurality of connections is both associated with a primary qubit and with an ancillary qubit. The apparatus includes a quantum processing device for evolving the quantum system according to one or more short-range unitary operators. The apparatus includes an encoding device for interacting with input qubits forming a subset of the set of primary qubits. The apparatus includes a measurement device for measuring at least a portion of the quantum system. The apparatus is configured for initializing the quantum system in an initial quantum state. The apparatus is configured, for each configuration of a number of configurations taken from the training data set, for:

encoding, by the encoding device, the configuration in the input qubits by interacting with the input qubits; and performing N rounds of operations, wherein each round comprises: applying, by the quantum processing device, a sequence of unitary operators acting on at least a portion of the quantum system; and performing, by the measurement device, a measurement of at least a portion of the quantum system.

The apparatus is configured for performing, by the measurement device, a measurement of one or more ancillary qubits. The apparatus is configured for determining at least one weight of a connection of the plurality of connections based at least on the measurement of the one or more ancillary qubits.

Embodiments are also directed to methods for operating the disclosed systems and devices, and to the use of the disclosed system to perform the methods according to the embodiments described herein.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings wherein:

FIG. 9 shows an example of an apparatus for performing machine learning using a quantum system according to embodiments described herein.

DETAILED DESCRIPTION

Figure 1A:
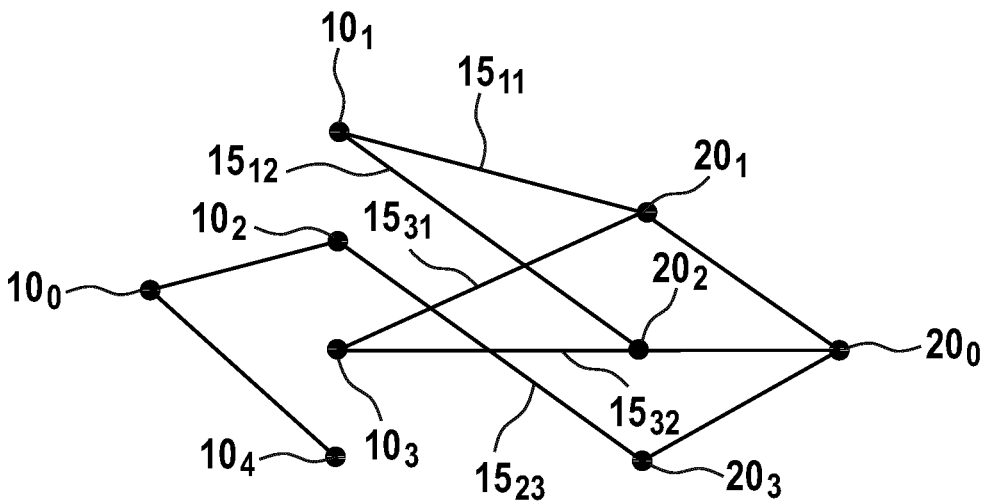
FIGS. 1*a-b* and 2 show examples of neural networks as described herein.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. The structures shown in the drawings are not necessarily depicted true to scale, and may contain details drawn in an exaggerated way to allow for a better understanding of the embodiments.

Embodiments described herein involve a method for performing machine learning using a quantum system. By using a quantum processing apparatus, unknown weights of a neural network can be computed i.e. the neural network can be trained. For the sake of intelligibility, but without intending to limit the scope, in the following an exemplary embodiment of the method is discussed. Thereafter, a detailed description of embodiments will be provided.

Figure 1B:
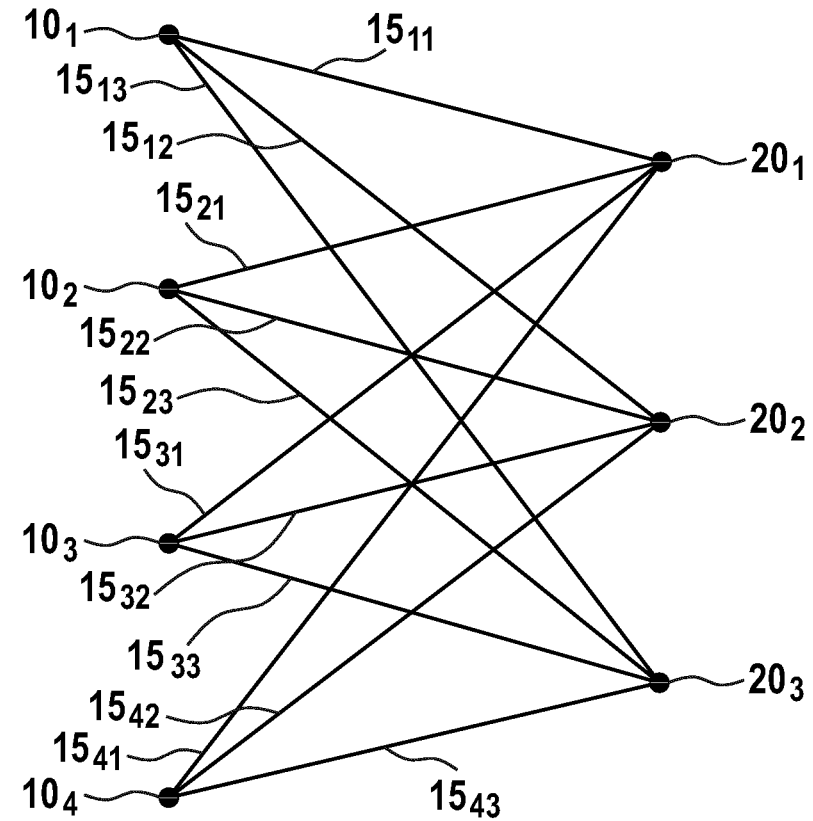

FIG. 1*b* shows an exemplary neural network including a visible layer (first set of nodes) and a hidden layer (second set of nodes). The visible layer shown in FIG. 1*b* consists of nodes $10_1$, $10_2$, $10_3$ and $10_4$. In other examples, a visible layer may include further or fewer nodes. The hidden layer shown in FIG. 1*b* consists of nodes $20_1$, $20_2$ and $20_3$. In other examples, a hidden layer may include further or fewer nodes.

The neural network includes a plurality of connections between the visible layer and the hidden layer. In FIG. 1*b*, each node in the visible layer is connected to each node in the hidden layer, i.e. the neural network is fully connected. There are $4 \times 3 = 12$ connections in total, the connections being indicated with $15_{ij}$ where i ranges from 1 to 4 and j ranges from 1 to 3. There are no connections between nodes within the visible layer and no connections between nodes within the hidden layer.

The neural network shown in FIG. 1*b* includes one hidden layer. In other examples, a neural network may include two or more hidden layers (deep neural network). Further, a neural network may include a source node and/or a sink node. A source node is a node not belonging to any visible or hidden layer which is connected to some or all of the nodes of the visible layer. A sink node is a node not belonging to any visible or hidden layer which is connected to some or all of the nodes of a hidden layer.

Each connection $15_{ij}$ between an i-th node and a j-th node of the neural network shown in FIG. 1*b* has a weight. The weight of the connection $15_{ij}$ may be denoted by $w_{ij}$. At least some of the weights $w_{ij}$ are a priori unknown numerical values, e.g. unknown numerical values taken from the set $\{0, 1\}$. A goal of a machine learning problem can be to determine, or learn, the unknown weights $w_{ij}$.

Figure 3:
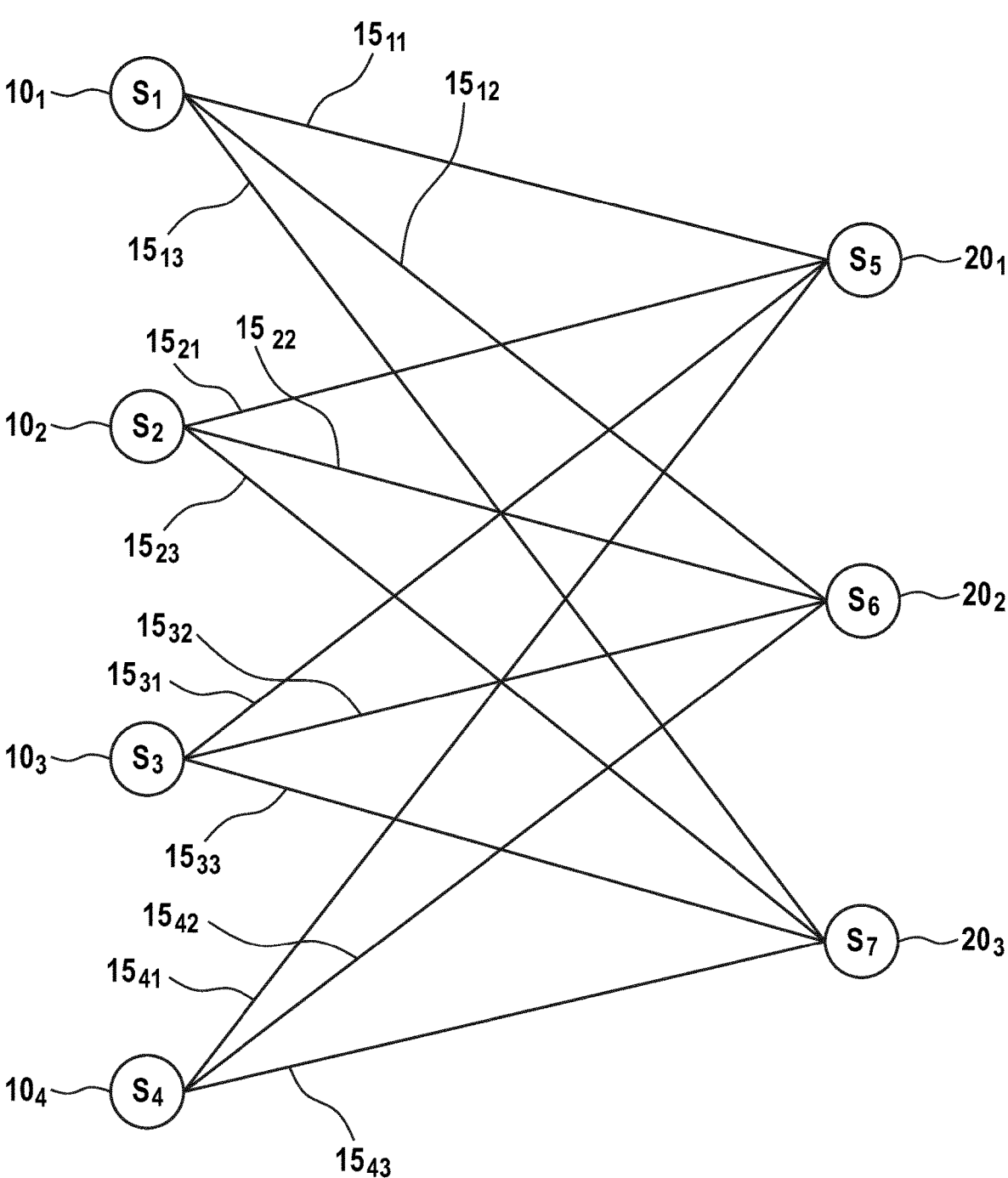
FIG. 3 shows an example of a classical spin modes associated with a neural network as described herein.

As illustrated in FIG. 3, the neural network of FIG. 1*b* can be associated with a classical spin model. As shown in FIG. 3, a classical spin is assigned to each node of the neural network. Accordingly, the classical spin model shown in FIG. 3 includes classical spins $s_1$, $s_2$, $s_3$ and $s_4$ located at the nodes $10_1$, $10_2$, $10_3$ and $10_4$, respectively, of the visible layer, and classical spins $s_5$, $s_6$ and $s_7$ located at the nodes $20_1$, $20_2$ and $20_3$, respectively, of the hidden layer. Each classical spin can be a two-state spin, i.e. a spin which can take two possible values or states. For example, each spin $s_i$ can belong to the set $\{1, -1\}$. The classical spin model can be an Ising spin model, which has an energy function of the form $$E(s_1, s_2, s_3, \ldots) = -\Sigma a_i s_i - \Sigma b_j s_j - \Sigma w_{ij} s_i s_j$$

Therein, the index i ranges over all nodes of the visible layer (i.e. i=1, 2, 3, 4) and the index j ranges over all nodes of the hidden layer (i.e. j=1, 2, 3). Further, $w_{ij}$ is the weight of the connection between the i-th node and the j-th node, as described above. Thus, the interactions between the spins of the classical spin model are determined by the weights of the corresponding connections of the neural network. Further, $a_i$ and $b_j$ are coefficients (representing local fields of the spin model). The Boltzmann distribution of the classical spin model is given by $$P_{SM}(s) = \exp(-E(s_1, s_2, s_3, \ldots))/Z$$

where Z is the partition function of the classical spin model and exp is the exponential function. In light of the above, the neural network shown in FIG. 1*b* is associated with, or mapped to, a classical spin model (Ising model) wherein the energy function, and hence the Boltzmann distribution, of the classical spin model depends on the weights of the neural network.

Figure 4:
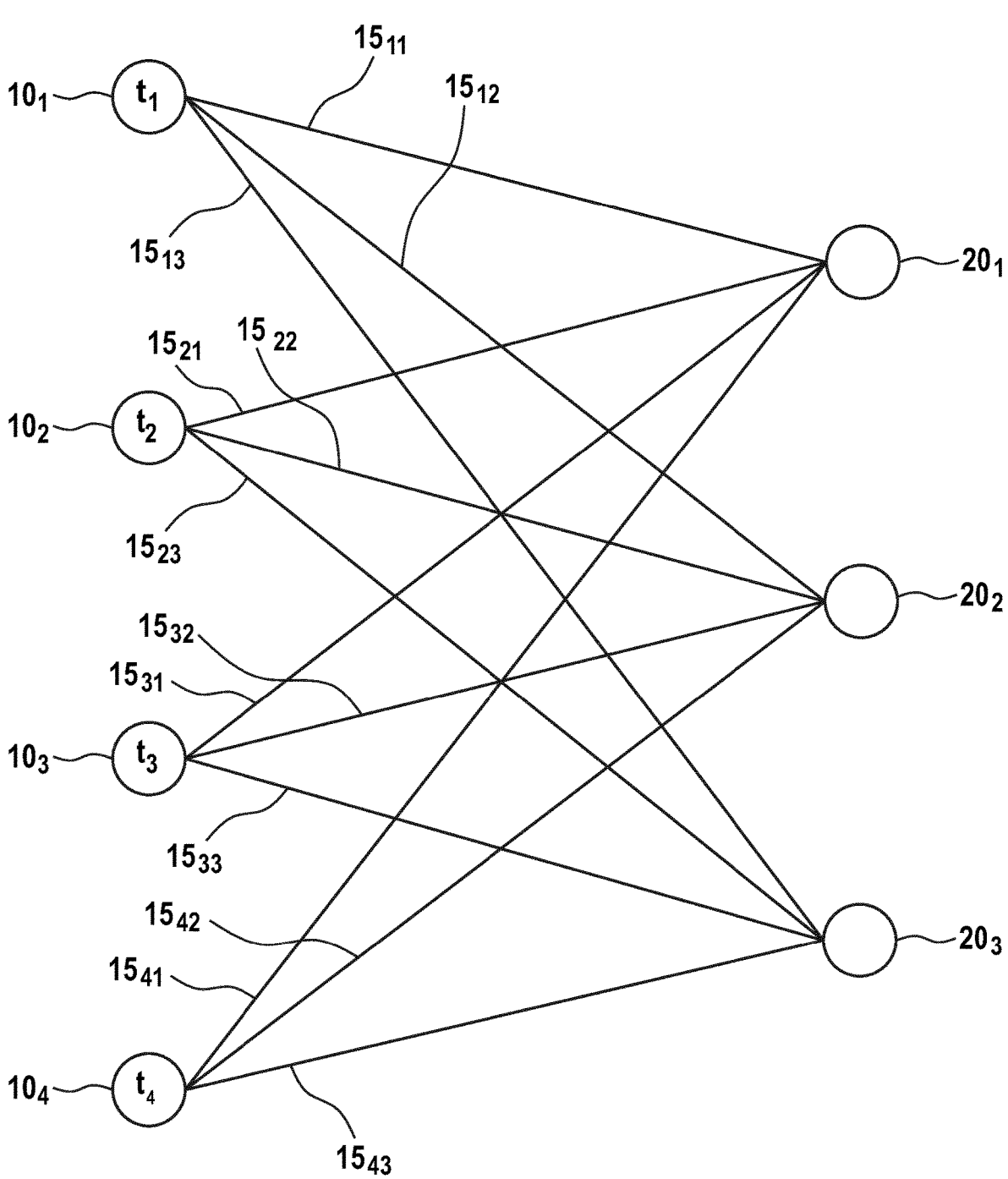
FIG. 4 shows an example of a training data configuration of a neural network as described herein.

A neural network can further include, as an input, a training data set. A training data set consists of a plurality of known configurations, called herein training data configurations. Each training data configuration assigns a specific state or value to each spin located at a node in the visible layer. In the example discussed above, each training data configuration has the form $t=(t_1, t_2, t_3, t_4)$ where $t_1$ is assigned to the node $10_i$ of the visible layer and where each $t_i$ is equal to either 1 or −1. This is illustrated in FIG. 4. For example, for the neural network shown in FIG. 1*b*, an example of a training data set can be the set $$\{(1,1,1,-1),(-1,-1,1,1),(-1,1,-1,1),(-1,1,1,1),(-1,-1,1-1,-1,-1)\}$$

which consists of five training data configurations. The training data set can be stored on a classical computing system.

Each training data configuration t of the neural network can occur with a certain probability $P_{TD}$ (t), i.e. a probability distribution can be defined over the training data set. For example, the training data probability distribution can be a uniform probability distribution, where each training data configuration occurs with the same probability i.e. $P_{TD}$=constant. The training data probability distribution is part of the input to the machine learning problem, i.e. this distribution can be known.

In addition to the training data probability distribution $P_{TD}$, which is a first probability distribution over the training data set, a second probability distribution over the training data set can be considered, namely by considering a marginal distribution of the Boltzmann distribution $P_{SM}$ defined above. For each training data configuration t, $P^{marg}$ (t) denotes the probability of finding the spins of the classical spin model in a spin configuration such that the spins associated with the visible layer are in the configuration t and the remaining spins can be in an arbitrary state. The probability $P^{marg}$ (t) is obtained by starting from the Boltzmann distribution $P_{SM}$ and summing out (integrating out) all spins located on nodes outside of the visible layer.

A machine learning problem can involve the task of calculating a suitable set of weights $w_{ij}$ for the connections of the neural network such that the condition $P_{TD}=P^{marg}(t)$ is satisfied (at least approximately) for all training data configurations t in the training data set. That is, this condition states that the training data probability distribution shall be approximately equal to the marginal distribution of the Boltzmann distribution.

The approach taken by the present disclosure for solving machine learning problems is to use a quantum system to which the neural network is mapped. As will be discussed in more detail below, the method according to embodiments described herein uses a quantum system wherein each weight of the neural network is associated with its own quantum degree of freedom, i.e. the quantum system includes a respective qubit ("ancillary qubit") for each weight. The method involves performing an iterative sequence of operations (unitary operations and measurements) to the quantum system, such that the quantum state of the ancillary qubits converges to a final state from which the unknown weights of the neural network can be read out by performing a final measurement at the end of the quantum computation.

Figure 5:
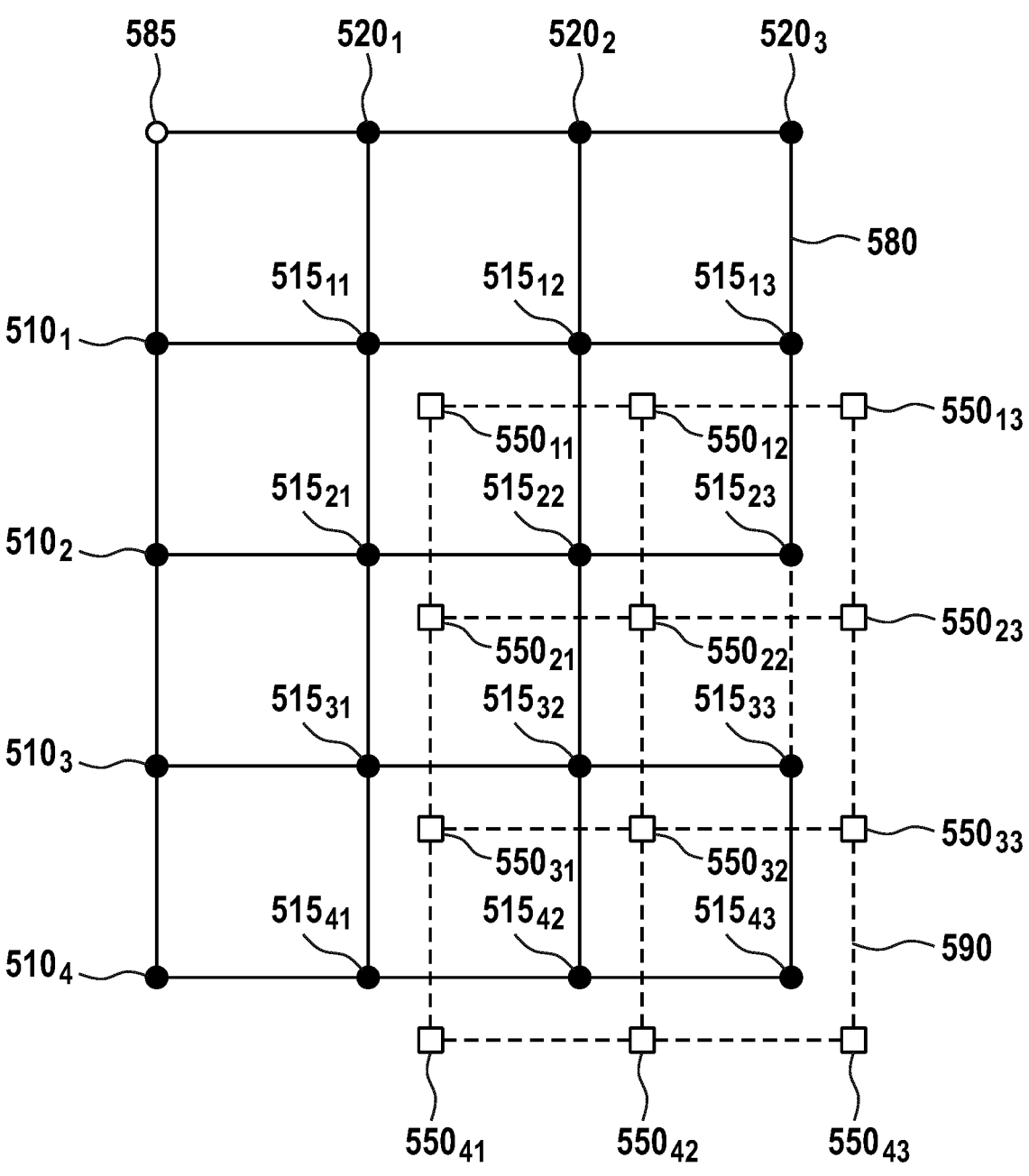
FIG. 5 shows an example of quantum system associated with a neural network as described herein.

The mapping from the neural network to a quantum system is illustrated in the following. FIG. 5 shows a quantum system associated with the neural network shown in FIG. 1*b*. The quantum system shown in FIG. 5 includes a set of primary qubits which are arranged according to a portion of a first two-dimensional lattice. The set of primary qubits includes primary qubits $510_1$, $510_2$, $510_3$ and $510_4$, primary qubits $520_1$, $520_2$, and $520_3$ and primary qubits $515ij$ where i ranges from 1 to 4 and j ranges from 1 to 3. In other words, the set of primary qubits involves three subsets of primary qubits.

The primary qubits $510_1$, $510_2$, $510_3$ and $510_4$, also called data qubits, are associated with the visible layer of the neural network. Each node $10_i$ of the visible layer shown in FIG. 1*b* is associated with a primary qubit $510_1$ shown in FIG. 5. The possible states of the classical spin $s_i$ located at node $10_i$ are encoded as possible quantum (basis) states of the associated primary qubit $510_i$. In one example, the quantum state $|0>$ for the qubit $510_i$ encodes the spin state $s_i=1$ and the quantum state $|1>$ encodes the spin state $s_i=-1$. As described in more detail below, the data qubits are optional i.e. they can be omitted.

The primary qubits $520_1$, $520_2$, and $520_3$ are associated with the hidden layer of the neural network. Each node $20_j$ of the hidden layer shown in FIG. 1*b* is associated with a primary qubit $520_j$ shown in FIG. 5. Similar to the data qubits, the possible states of the classical spin $s_i$ located at node $20_j$ are encoded as possible quantum (basis) states of the associated primary qubit $520_j$.

Further, the primary qubits $515_{ij}$ are associated with the connections of the neural network. Each connection $15_{ij}$ between a node $10_i$ and a node $20_j$ shown in FIG. 1*b* is associated with a primary qubit $515_{ij}$ shown in FIG. 5. The possible parities of the interaction between the classical spin $s_i$ located at node $10_i$ and the classical spin $s_j$ located at node $10_j$ are encoded as possible quantum (basis) states of the associated primary qubit $515_{ij}$. In an example, the quantum state $|0>$ for the qubit $515_{ij}$ encodes a situation wherein the spins $s_i$ and $s_j$ are aligned with each other (i.e. both spins are equal to 1 or both spins are equal to −1, i.e. the parity is even) and the quantum state $|1>$ encodes a situation wherein the spins $s_i$ and $s_j$ are anti-aligned with each other (i.e. one spin is equal to 1 and the other spin is equal to −1, i.e. the parity is odd).

In addition to the set of primary qubits, the quantum system includes a set of ancillary qubits $550_{ij}$, which may be arranged according to a portion of a second two-dimensional lattice, as shown in FIG. 5. The first and second two-dimensional lattices may be arranged such that each ancillary qubit is paired with, i.e. positioned adjacent to, a primary qubit.

The ancillary qubits are associated with the weights of the connections of the neural network. That is, each connection $15_{ij}$ between a node $10_i$ and a node $20_j$ shown in FIG. 1*b* is associated with an ancillary qubit $550_{ij}$ shown in FIG. 5. The ancillary qubit $550_{ij}$ encodes the weight $w_{ij}$ of the connection. In an example, a quantum state $|0>$ of the ancillary qubit $550_{ij}$ encodes the weight $w_{ij}=0$ and the quantum state $|1>$ encodes the weight $w_{ij}=1$.

In light of the above, each connection of the neural network is associated with both a primary qubit an ancillary qubit. The ancillary qubit encodes the weight of the connection.

As mentioned above, the approach taken by the present disclosure is to perform a sequence of quantum operations which drive the ancillary qubits towards a quantum state $|\psi_{solution}>$ encoding the solution to the machine learning problem i.e. the state $|\psi_{solution}\rangle$ encodes the unknown weights of the neural network. Whereas several possible sequences of quantum operations may be considered to this end, in the following we discuss one specific example as an illustration of the method described herein.

The method may start by initializing each qubit in the system (i.e. the primary qubits as well as the ancillary qubits) in an initial quantum state, such as for example the state $|+\rangle=(|0\rangle+|1\rangle)/\sqrt{2}$. This can be accomplished, for example, by cooling the quantum system to the ground state of the Hamiltonian $\Sigma_k \sigma_x^{(k)}$ where $\sigma_x^{(k)}$ is a Pauli operator ("sigma-x") acting on the k-th qubit, and the sum ranges over all qubits in the quantum system.

Further, a first training data configuration $t_1$ is taken from the training data set. The first training data configuration $t_1$ may be obtained by randomly sampling the training data set according to the training data probability distribution $P_{TD}$. For example, if $P_{TD}$ is a uniform distribution, the first training data configuration may be obtained by generating a uniformly random sample of the training data set.

In connection with the first training data configuration $t_1$, a plurality of quantum operations are carried out. Some of these quantum operations may act on the primary qubits, some may act on the ancillary qubits, and some may act on jointly on at least one primary qubit and at least one ancillary qubit. The aim of the quantum operations relating to the first training data configuration $t_1$ is to "write" the configuration $t_1$ into the quantum system and to evolve the ancillary qubits at least in the direction of the quantum state $|\psi_{solution}\rangle$ which encodes the solution to the machine learning problem (even though at this initial stage the $|\psi_{solution}\rangle$ might not yet be reached). After the quantum operations relating to the first training data configuration $t_1$ have been carried out, a second training data configuration $t_2$ is taken from the training data set, again by randomly sampling the distribution $P_{TD}$. In connection with the second training data configuration $t_2$, another plurality of quantum operations is carried out. These quantum operations aim to evolve the ancillary qubits further towards the solution-encoding quantum state $|\psi_{solution}\rangle$. This procedure is continued, i.e. in each step of the procedure a training data configuration is obtained by sampling the training data set, and a plurality of quantum operations is performed to write this training data configuration into the quantum system and to further evolve the quantum system towards the quantum state $|\psi_{solution}\rangle$. By performing many iterations of this procedure, the ancillary qubits will converge to a quantum state which is at least close to the quantum state $|\psi_{solution}\rangle$.

Returning to the first training data configuration $t_1$, the quantum operations performed in connection with $t_1$ may include the following operations.

First, one or more strong fields (e.g. magnetic fields) are applied to bias the data qubits (e.g. the primary qubits $510_1$, $510_2$, $510_3$ and $510_4$ in FIG. 5) towards a target quantum state which encodes the first training data configuration $t_1$. Writing $t_1=(t_{11}, t_{12}, t_{13}, t_{14})$ where the value $t_{1i}$ associated with the node $10_i$ is equal to 1 or $-1$, this can be achieved, for example, by applying a field which biases the qubit $510_i$ towards the state $|0\rangle$ if $t_{1i}$ is equal to 1 and which biases the qubit $510_i$ towards the state $|1\rangle$ if $t_{1i}$ is equal to $-1$. Thus, the strong fields encode or "write" the information contained in the first training data configuration $t_1$ into the set of primary qubits.

Alternatively, training data configurations may be encoded in the primary qubits in other ways, e.g., by two-body interactions between pairs of connection-type primary qubits as described herein. In such cases, data qubits need not be present. This will be discussed in more detail further below.

Next, a sequence of unitary operators having the form of a sequence of alternations $A_1\ B_1\ A_2\ B_2$ is applied to the quantum system. The number of operators $A_k$ and $B_k$ in the sequence may be very large, e.g. the sequence may include several hundred or even several thousand operators. The operators $A_k$ and $B_k$ may act fully inside the set of primary qubits. The operators $A_k$ and $B_k$ may be taken from a first family of unitary operators. For example, each $A_k$ may be an operator of the form $$U_x(\beta) = \Pi_j e^{-i\beta\sigma_x^{(j)}}.$$

Therein, $\beta$ is a parameter, $\sigma_x^{(j)}$ is a Pauli operator ("sigma-x") acting on the j-th qubit, and the index j ranges, for example, over all primary qubits except for the data qubits. For example, with respect to FIG. 5, the index j regards the primary qubits $520_k$ and $515_{kl}$ (k=1, 2, 3; l=1, 2, 3, 4). Each $B_k$ may be an operator of the form $$U_c(\Omega) = \Pi_l e^{-i\Omega C_l \sigma_z^{(l,n)}\sigma_z^{(l,e)}\sigma_z^{(l,s)}\sigma_z^{(l,w)}}$$

Therein, the index l ranges over all plaquettes of the two-dimensional lattice according to which the primary qubits are arranged, and n, e, s and w designate the four primary qubits of each l-th plaquette. Further, $$\sigma_z^{(l,n)}, \sigma_z^{(l,e)}, \sigma_z^{(l,s)}, \sigma_z^{(l,w)}$$

are Pauli operators acting on the primary qubits n, e, s and w of the l-th plaquette. Further, $\Omega$ and $C_l$ are parameters.

The parameters $\beta$ and $\Omega$ are considered as variational parameters, as explained below.

After the sequence $A_1\ B_1\ A_2\ B_2\ \ldots$ has been applied to the quantum system, an energy measurement, namely a measurement of the following Hamiltonian (called herein total Hamiltonian), is performed:

$$H(t) = \sum_k a_k \sigma_z^{(k,p)}\sigma_z^{(k,a)} + C(t)\sum_l C_l \sigma_z^{(l,n)}\sigma_z^{(l,e)}\sigma_z^{(l,s)}\sigma_z^{(l,w)}$$

Therein, the index k ranges over all connections of the neural network, and (k,p) and (k,a) denote the primary qubit and the ancillary qubit, respectively, associated with the k-th connection. Further, $\sigma_z^{(k,p)}$ is a Pauli operator ("sigma-z") acting on the primary qubit (k,p), and $$\sigma_z^{(k,a)}$$

is a Pauli operator acting on the ancillary qubit (k,a). Further, $a_k$ is a parameter. Further, $$\sigma_z^{(l,n)}, \sigma_z^{(l,e)}, \sigma_z^{(l,s)}, \sigma_z^{(l,w)}$$

are as defined above. Further, C(t) a parameter.

After the total Hamiltonian is measured, the measured energy is recorded. The qubits may then be re-initialized (e.g. in the state |+> as described above), and one or more fields are again applied to write the first training data configuration $t_1$ into the data qubits (alternatively, the fields in question may be switched on continuously i.e. they may never have been switched off in the first place). Another sequence $A_1 B_1 A_2 B_2$ . . . is applied to the quantum system, now with new values for the parameters $\beta$ and $\Omega$. The new values of $\beta$ and $\Omega$ can be obtained by starting out from the values of $\beta$ and $\Omega$ taken in the previous round and adding small perturbations $\delta\beta$ and $\delta\Omega$ respectively. The sequence $A_1 B_1 A_2 B_2$ . . . is again followed by a measurement of the total Hamiltonian. The energy measured in the latter measurement is compared with the energy measured in the previous round. The values of $\beta$ and $\Omega$ corresponding with the smaller energy of the two energies are kept and the values corresponding with the larger energy are discarded. The values of $\beta$ and $\Omega$ that are kept will form the starting point for a next round of operations. This process is continued, i.e. in each round a sequence $A_1 B_1 A_2 B_2$ . . . is applied to the quantum system, wherein the values of $\beta$ and $\Omega$ used in that sequence are determined by starting out from the kept values of the previous energy comparison and slightly perturbing these kept values. This iterative procedure is repeated many times. The aim of this process is to lower the energy as much as possible i.e. to find values of $\beta$ and $\Omega$ corresponding to a quantum state of small energy. The operations $A_1 B_1 A_2 B_2$ . . . may be performed while the one or more fields are applied to bias the data qubits towards the target state encoding the first training data configuration $t_1$. In doing so, the quantum system is driven to a quantum state of low energy subject to the condition that the data qubits are biased towards the target state in question. This can be understood as a lowest energy search under a side condition which keeps part of the system in a fixed state. The fixed part of the quantum system acts as an effective local field on the dynamical part. After a predetermined number of iterations (e.g. 100, 1000 or more iterations), the resulting optimal values $\beta_1$ and $\Omega_1$ are recorded.

Thereafter, the qubits are again re-initialized (e.g. in the state |+>), and the first training data configuration $t_1$ is again encoded into the data qubits. Further, the sequence $A_1 B_1 A_2 B_2$ . . . corresponding to the optimal values optimal values $\beta_1$ and $\Omega_1$ obtained previously is applied to the quantum system. The resulting quantum state is denoted by $|\psi_1>$. On the latter state, a sequence of alternations $C_1 D_1 C_2 D_2$ . . . is applied. The number of alternations may again be several hundred or even several thousand. The operators $C_k$ and $D_k$ may be operators taken from a second family of unitary operators different from the first family of operators. For example, each operator $C_i$ may have the form $$U_{xa}(\alpha) = \Pi_m e^{-i\alpha\sigma_x^{(m)}}$$

Therein, $\alpha$ is a parameter, $\sigma_x^{(m)}$ is a Pauli operator acting on the m-th ancillary qubit, and the index m ranges over all ancillary qubits of the quantum system. Thus, $U_{xa}(\alpha)$ acts on the ancillary qubits only. Further, each operator $D_i$ may have the form $$U_a(\tau) = \Pi_k e^{-i\tau\sigma_z^{(k,p)}\sigma_z^{(k,a)}}$$

Therein, the index k ranges over all connections of the neural network, and (k,p) and (k.a) are as defined above. Further, $\tau$ is a parameter. The parameters $\alpha$ and $\tau$ play the role of variational parameters, like the parameters $\beta$ and $\Omega$. Notably, the operator $U_a(\tau)$ couples the primary qubits with the ancillary qubits and thus allows to "move" information from the primary qubits to the ancillary qubits.

After the sequence $C_1 D_1 C_2 D_2$ has been applied to the state $|\psi_1>$, the total Hamiltonian as described above is measured, and the measured energy is recorded. Similar to the discussion above, in order to minimize the energy a plurality of rounds of this kind is performed. In each round a sequence $C_1 D_1 C_2 D_2$ . . . is applied to the state $|\psi_1>$ with suitable values for the parameters $\alpha$ and $\tau$, followed by a measurement of the total Hamiltonian. The values of $\alpha$ and $\tau$ chosen for a given round are based on the previously obtained values of $\alpha$ and $\tau$ corresponding to the smallest measured energy, to which a small perturbation is added. After a predetermined number of iterations (e.g. 100, 1000 or more iterations), the resulting optimal values $\alpha_1$ and $\tau_1$ are recorded. Similar to what was described above, this may be a minimization of the energy subject to the condition that the data qubits are biased towards the target state encoding the first training data configuration $t_1$.

Thus, at this stage of the procedure, optimal values $\beta_1, \Omega_1$, $\alpha_1$ and $\tau_1$ have been obtained in connection with the first data training configuration $t_1$.

The above procedure is carried many times in connection with a plurality of training data configurations. That is, a second training data configuration $t_2$, a third training data configuration $t_3$, and so on, are generated by sampling the distribution $P_{TD}$. For each such training data configuration $t_i$ the above-discussed operations are carried out. For each configuration $t_i$, optimal values $\beta_i$, $\Omega_i$ are determined by iteratively applying the sequences $A_1 B_1 A_2 B_2$ . . . followed by a measurement of the total Hamiltonian. In analogy with the state $|\psi_1>$ considered above for the first training data configuration $t_i$, let $|\psi_1>$ denote the quantum state obtained by applying the sequence $A_1 B_1 A_2 B_2$ . . . corresponding to the optimal values $\beta_i$ and $\Omega_i$ relating to the i-th training data configuration $t_i$. Also in analogy with the above procedure for $t_1$, a plurality of sequences $C_1 D_1 C_2 D_2$ . . . are applied to the state $|\psi_1>$ each followed by a measurement of the total Hamiltonian, eventually resulting in optimal values $\alpha_i$ and $\tau_i$ relating to the configuration $t_i$. Notably, when applying the first sequence $C_1 D_1 C_2 D_2$ . . . in connection with $t_i$, it may be beneficial to start out from the optimal values $\alpha_{i-1}$ and $\tau_{i-1}$ obtained for the previous training data configuration $t_{i-1}$. Further, the number of operators in the sequence $C_1 D_1 C_2 D_2$ . . . , i.e. the length of the sequence, considered in connection with the configuration may be kept relatively small (for example, the sequence may involve 100 or less operators) in order not to move too far away from the optimal $\alpha_{i-1}$ and $\tau_{i-1}$ that were found in connection with the previous training data configuration $t_{i-1}$. In other words, it may be beneficial to look for optimal $\alpha_i$ and $\tau_i$ in a small region around the optimal $\alpha_{i-1}$ and $\tau_{i-1}$ in order not to lose the information contained in the values $\alpha_{i-1}$ and relating to the previous training data configuration.

After carrying out the above iterative procedure for a large number of training data configurations sampled from the training data set, the ancillary qubits (e.g. the qubits 550ij shown in FIG. 5) are measured in the basis {|0>, |1>}. The measurement of each ancillary qubit yields as an outcome a numerical value which is equal to 0 or 1. If the measurement outcome for an ancillary qubit is 0, it is determined that the associated weight of the neural network is equal to 0.

Likewise, if the measurement outcome is 1, it is determined that the weight is equal to 1. Accordingly, the initially unknown weights of the neural network are determined by reading out the ancillary qubits. In particular, the weights determined by the method according to embodiments described herein are such that the condition $P^{marg}$ (t)≈$P_{TD}$(t) is fulfilled for each training data configuration t in the training data set. Accordingly, embodiments described herein provide a method for training a neural network using a quantum system.

In light of the above, according to an embodiment, a method for machine learning using a quantum system is provided. The method includes providing a quantum system comprising a set of primary qubits and a set of ancillary qubits. A neural network is associated with the quantum system. The neural network includes a first set of nodes and a second set of nodes. The neural network includes a plurality of connections between the first set of nodes and the second set of nodes, each connection having a weight. At least some of the weights may be unknown weights. The neural network includes a training data set comprising a plurality of configurations for the first set of nodes. Each connection of the plurality of connections is both associated with a primary qubit and with an ancillary qubit. The method includes initializing the quantum system in an initial quantum state. The method includes, for each configuration of a number of configurations taken from the training data set, encoding the configuration in input qubits that form a subset of the set of primary qubits. The method includes, for each configuration of the number of configurations, performing N rounds of operations. Each round includes applying a sequence of unitary operators acting on at least a portion of the quantum system, and performing a measurement of at least a portion of the quantum system. The method includes performing a measurement of one or more ancillary qubits. The method includes, based at least on the measurement of the one or more ancillary qubits, determining at least one weight of a connection of the plurality of connections.

Embodiments described herein thus allow determining a solution to a machine learning problem using a quantum system. Compared to determining a solution to a machine learning problem using solely a classical computing system, i.e., without a quantum system, embodiments described herein may provide a decrease in computational time required for solving the machine learning problem, or make the machine learning problem computable at all. In other words, compared to classical computing systems, embodiments described herein may allow solving machine learning problems faster, or may even enable finding such a solution in the first place since the computation of the solution may take too long on a classical computing system to compute.

Further, the ancillary qubits of the quantum system are configured for encoding the weight of the connections. In other words, by providing the ancillary qubits, embodiments described herein associate a quantum degree of freedom to each weight of the neural network, i.e. the weights themselves are "quantized". This is different from approaches involving usage of a quantum system to solve machine learning problems, but in which the weights are associated with classical degrees of freedom (e.g. each weight can be associated with a magnetic field acting on a primary qubit, without any ancillary qubits being present). By quantizing the weights, it becomes possible to fully exploit the benefits of quantum mechanics in order to determine the unknown weights. That is, the ancillary qubits associated with the weights can exhibit quantum mechanical effects—e.g. they can be in a superposition state involving a combination of multiple weights—and it is believed that such quantum effects can be exploited for substantially decreasing the time needed for determining the unknown weights, i.e. speeding up the calculation of the weights. In comparison, systems where a neural network is associated to a quantum system but where the weights are encoded as (semi-)classical degrees of freedom such as magnetic fields might at best exhibit a partial speed-up of the computation time. The speed-up achieved by such systems is likely to be smaller than the one achievable by the present method, since the latter involves a quantization of the weights themselves i.e. a computation which is fully quantum in its nature.

Neural Networks

Embodiments described herein involve the notion of a neural network. FIGS. 1a and 1b show examples of neural networks.

A neural network includes a plurality of nodes. The plurality of nodes may include a first set of nodes, or "visible layer", such as nodes $10_1$, $10_2$, $10_3$ and $10_4$ shown in FIG. 1a. The plurality of nodes may include a second set of nodes, or "hidden layer", such as nodes $20_1$, $20_2$ and $20_3$ shown in FIG. 1a. The plurality of nodes may include a third set of nodes, fourth set of nodes, and so on (not shown in FIG. 1a), each of which may be a further "hidden layer". That is, a neural network may include a multitude of hidden layers. When two or more hidden layers are provided, a neural network may be referred to as a deep neural network.

A neural network may include further nodes. For example, a neural network may include a source node $10_0$ and/or a sink node $20_0$, as shown in FIG. 1a.

The neural networks shown in the figures are small neural networks for ease of presentation. Much larger neural networks can be considered. For example, a neural network may include 1000 nodes or even up to 100.000.000 nodes and/or may include 10 or even up to 100 layers.

A neural network includes a plurality of connections between the first set of nodes and the second set of nodes. For example, FIG. 1a shows connections $15_{ij}$ between the first set of nodes and the second set of nodes, where a connection $15_{ij}$ is a connection between a node $10_i$ of the first set of nodes and a node $20_j$ of the second set of nodes. No connections may exist inside the first set of nodes. No connections may exist inside the second set of nodes. No connections may exist between any set of nodes belonging to a layer.

A neural network may include one or more connections between the source node and the first set of nodes, as shown for example in FIG. 1a. Additionally or alternatively, a neural network may include one or more connections between the sink node and the second set of nodes, as shown for example in FIG. 1a.

FIG. 1b shows a further example of a neural network. Like the neural network shown in FIG. 1a, the neural network of FIG. 1b includes nodes $10_1$, $10_2$, $10_3$ and $10_4$ forming a first set of nodes (visible layer) and nodes $20_1$, $20_2$ and $20_3$ forming a second set of nodes (hidden layer). The neural network may optionally include a source node and a sink node (not shown). The neural network shown in FIG. 1b is fully connected. Each node of the first set of nodes is connected to each node of the second set of nodes. Accordingly, the neural network of FIG. 1b includes connections $15_{ij}$ where i ranges from 1 to 4 and j ranges from 1 to 3 i.e. 4×3=12 connections in total.

Figure 2:
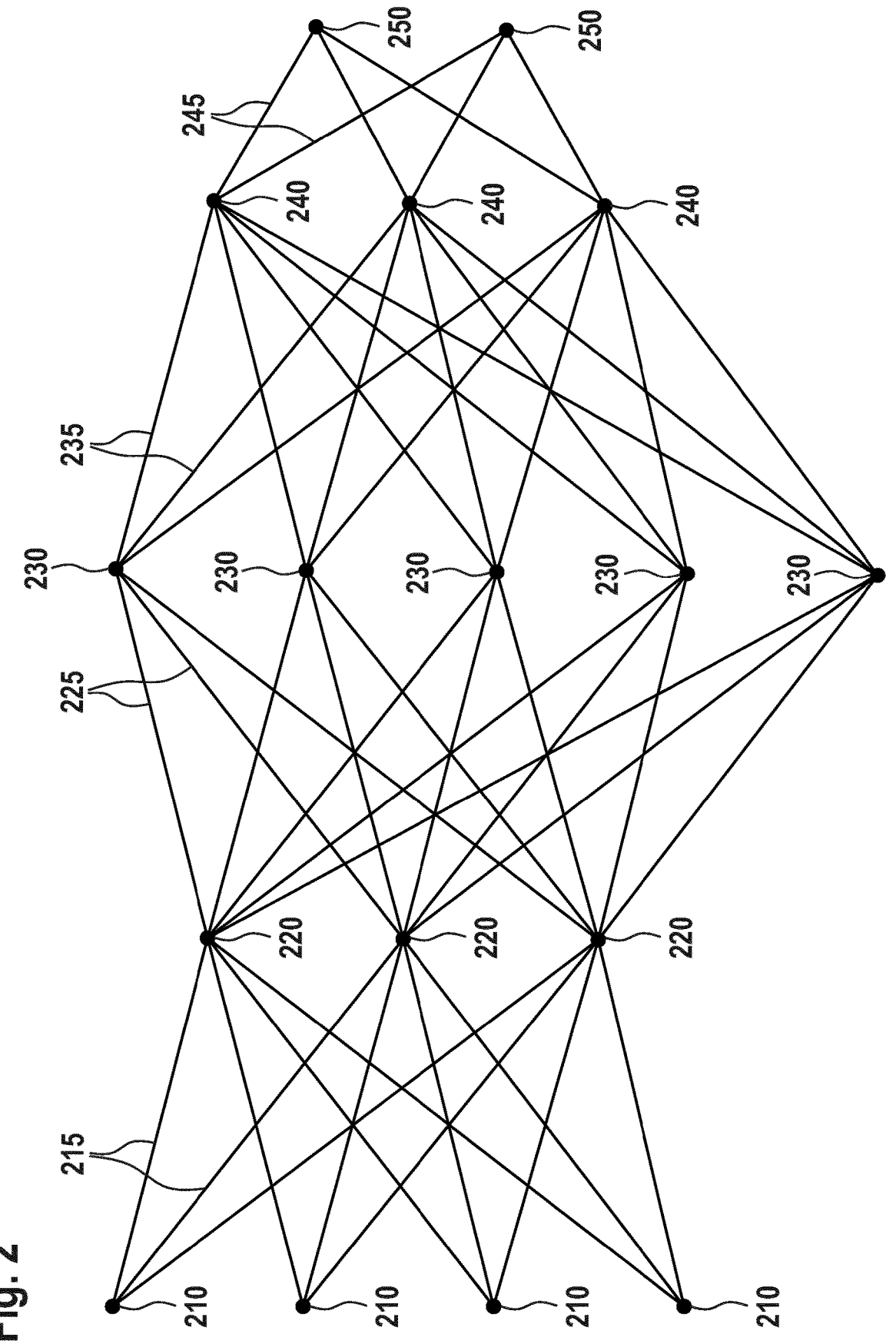

FIG. 2 shows a further example of a neural network. The neural network is a deep neural network. The neural network includes nodes 210 forming a first set of nodes (visible layer) and nodes 220 forming a second set of nodes (hidden layer).

The neural network includes connections 215 between the first set of nodes and the second set of nodes. The neural network includes nodes 230 forming a third set of nodes, nodes 240 forming a fourth set of nodes and nodes 250 forming a fifth set of nodes. The third set of nodes, the fourth set of nodes and the fifth set of nodes may be understood as further hidden layers of the neural network, additionally to the nodes 220. The neural network includes connections 225 between the second set of nodes and the third set of nodes, connections 235 between the third set of nodes and the fourth set of nodes, and connections 245 between the fourth set of nodes and the fifth set of nodes.

A neural network may be a deep neural network. A neural network may include a third set of nodes. The neural network may include a plurality of connections between the second set of nodes and the third set of nodes, e.g. connections 225 shown in FIG. 2. No connections may exist inside the third set of nodes. No connections may exist between the first set of nodes and the third set of nodes.

A neural network may include a fourth set of nodes. The neural network may include a plurality of connections between the third set of nodes and the fourth set of nodes, e.g. connections 235 shown in FIG. 2. No connections may exist inside the fourth set of nodes. No connections may exist between the first set of nodes and the fourth set of nodes. No connections may exist between the second set of nodes and the fourth set of nodes.

Accordingly, a deep neural network may include multiple sets of nodes (layers), wherein, for each k, one or more connections may exist between the k-th set of nodes and the (k+1)-th set of nodes and one or more connections may exist between the k-th set of nodes and the (k−1)-th set of nodes, but there are no connections between the k-th set of nodes and any other set of nodes. That is, connections may exist between adjacent sets of nodes only. In addition, no connections may exist within any k-th set of nodes.

The neural network shown on FIG. 2 is fully bipartite connected. Each node of the k-th set of nodes is connected to each node of the (k+1)-th set of nodes.

A connection of a neural network may have a weight. A weight can be regarded as a strength of an interaction or of a signal between two nodes. The weight of a connection between an i-th node and a j-th node may be denoted by $w_{ij}$. For example, in FIGS. 1a and 1b, every connection $w_{ij}$ may be assigned a weight $w_{ij}$. A weight may be a numerical value, such as for example 0 or 1 (or, likewise, 1 or −1). Other weights are also possible, e.g. a weight can be any numerical value (integer or real number).

A connection between two nodes having the weight 0 can be understood as the absence of a connection between the two nodes. Therefore, without loss of generality, it can be considered that a neural network is "fully bipartite connected", i.e. every node of the first set of nodes is connected with every node of the second set of nodes, every node of the second set of nodes is connected with every node of the third set of nodes, and so on, with some of the connections possibly having a zero weight. Examples of fully bipartite connected neural networks are shown in FIG. 1b and FIG. 2.

In the context of machine learning, at least some of the weights of the neural network may be unknown weights. An aim may be to determine, or "learn", one or more unknown weights of the neural network. The notion of a "machine learning problem" will be used herein to refer to a task involving the determination of one or more unknown weights of a neural network, i.e. the task of training the neural network. Particularly, a machine learning problem as described herein may be an unsupervised learning problem, which may involve the task of unsupervised training of the neural network.

A neural network may be associated with a classical spin model. A classical spin model may include a plurality of classical spins $s_1, s_2, s_3, \ldots$ . Each classical spin $s_i$ may be assigned to, or located at, a respective i-th node of the neural network. A classical spin may have a numerical value, or state. The classical spin may have a numerical value taken from a set consisting of two elements, or be in one of two states. For example, each classical spin may have a numerical value, or state, which is either 1 or −1, represented mathematically as $s_i \in \{1, -1\}$. It shall be understood that the values may be different. For instance, the values or states may be $s_i \in \{0, 1\}$.

In some implementations, a classical spin model may include a classical spin $s_i$ for each node of the neural network. In other implementations, one or more nodes of the neural network may not be assigned a classical spin $s_i$.

For example, a classical spin may be associated with the source node and/or a further classical spin may be associated with the sink node. Alternatively, a classical spin model may not include classical spins associated with the source node or the sink node. A spin model may include classical spins associated with the nodes of the visible layer and the nodes of the hidden layer(s) of the neural network only. In further implementations, a classical spin associated with the source node and/or a classical spin associated with the sink node may be fixed spins. For example, both of these spins may be fixed to the value 1.

For example, FIG. 3 shows the neural network of FIG. 1b, with classical spins $s_1, s_2, s_3$ and $s_4$ located at the four nodes of the visible layer, and classical spins $s_5, s_6$ and $s_7$ located at the three nodes of the hidden layer. If further hidden layers are present (deep neural network), further spins can similarly be located at the nodes of these further hidden layers.

A classical spin model may be provided with a probability distribution, denoted herein as a probability distribution $P_{SM}$. Each configuration $s=(s_1, s_2, s_3, \ldots)$ of the classical spins of the classical spin model may occur with a certain probability according to the probability distribution $P_{SM}$.

In some implementations, the classical spin model has an energy function $E(s_1, s_2, s_3, \ldots)$ which assigns an energy to each configuration $s=(s_1, s_2, s_3, \ldots)$ of the classical spins. For example, if there is a connection between an i-th node and a j-th node of the neural network (particularly, a connection having a non-zero weight), it may be considered that the spins located at the i-th and j-th nodes are coupled to each other in the classical spin model. Accordingly, the energy function $E(\cdot)$ may include a respective interaction term for each connection of the neural network.

The probability distribution $P_{SM}$ may be the Boltzmann distribution of the classical spin model in question. The probability that a spin configuration $s=(s_1, s_2, s_3, \ldots)$ occurs may be given by the formula $P_{SM}(s)=\exp(-E(s_1, s_2, s_3, \ldots))/Z$ where Z is the partition function of the classical spin model and $\exp(\cdot)$ is the exponential function. The neural network may be a restricted Boltzmann machine.

The probability distribution $P_{SM}$ of the classical spin model may depend on at least some of the weights of the connections of the neural network. Particularly, the energy function $E(s_1, s_2, s_3, \ldots)$ may depend on at least some of the weights. For example, the classical spin model may be an Ising spin model. The energy function of the Ising spin model has the form $$E(s_1, s_2, s_3, \ldots) = -\Sigma a_i s_i - \Sigma b_j s_j - \Sigma w_{ij} s_i s_j$$

Therein, the index i ranges over all nodes of the first set of nodes ("visible layer") and the index j ranges over all nodes of the second set of nodes ("hidden layer"). Further, $w_{ij}$ is the weight of the connection between the i-th node and the j-th node, and $a_i$ and $b_j$ are coefficients. In case of a deep neural network, the energy function of the Ising spin model may also be provided. For example, where the neural network includes a third set of nodes (such as nodes 230 shown in FIG. 2), i.e. a further hidden layer, then the energy function may include additional terms of the form $-\Sigma c_k\, s_k$ and/or $-\Sigma w_{jk}\, s_j\, s_k$, where k ranges over all nodes of the third set of nodes, $s_k$ is a classical spin located at the k-th node of the third set of nodes, $c_k$ is a coefficient and $w_{jk}$ is the weight of the connection between the j-th node of the second set of nodes and the k-th node of the third set of nodes.

A neural network can include a training data set comprising a plurality of configurations for the first set of nodes, i.e. for the visible layer. A configuration in the training data set is also referred to herein as a training data configuration. A training data configuration may be understood as an assignment of a specific numerical value or state (e.g. 1 or −1) to each spin associated with the first set of nodes (i.e. the visible layer). In other words, a training data configuration is a set of numerical values, wherein each numerical value is associated with a node of the first set of nodes. Each numerical value comprised in a training data configuration may be an element of the set of possible states of the spins of the classical spin model. For example, if $\{1, -1\}$ is the set of possible states of the classical spin model, then each numerical value comprised in a training data configuration belongs to the set $\{1, -1\}$. A training data configuration can be regarded as a partial configuration of the spins, wherein a spin state is assigned to the nodes in the visible layer but not to the remaining nodes of the neural network.

For example, the first set of nodes may consist of nodes $v_1, v_2, v_3, \ldots$. A training data configuration may have the form $t=(t_1, t_2, t_3, \ldots)$, wherein each $t_i$ is a numerical value, e.g. each $t_i$ is either 1 or −1. For each i, the value $t_i$ is associated with the node $v_i$ of the first set of nodes. The number of values $t_i$ may be the same as the number of nodes in the first set of nodes, i.e. the number of nodes in the visible layer.

FIG. 4 illustrates the notion of a training data configuration for the neural network shown in FIG. 1b. In the neural network shown in FIG. 1b, the first set of nodes includes 4 nodes. Each training data configuration may have the form $t=(t_1, t_2, t_3, t_4)$ where each value $t_i$ is assigned to the node 10$_i$, as illustrated in FIG. 4. An example of a training data configuration may be t=(1, 1, 1, −1).

A training data set includes a plurality of training data configurations. For example, for the neural network shown in FIG. 1b, an example of a training data set can be the set $$\{(1,1,1,-1),(-1,-1,1,1),(-1,1,-1,1),(-1,1,1,1),(-1,-1,1-1,-1)\}.$$

A training data set may be regarded as an input to a machine learning problem, i.e. data which is known to the user. A training data set may be used for training the neural network. In some embodiments, a training data configuration may be obtained by performing one or more computational processing operations on an initial data string. Such computational processing operations may be performed for obtaining some or all training data configurations in the training data set. For example, an initial data string may be a string of bits, wherein a bit (i.e. a value 0 or 1) is assigned to each node of the visible layer. The initial data string may be processed by replacing each bit 0 by the value 1 and each bit 1 by the value −1. Accordingly, a training data configuration may be obtained, wherein the training data consists of a sequence of values, wherein each value is 1 or −1. In another example, an initial data string can consist of a sequence of values each equal to 1 or −1, but wherein the length of the sequence is shorter than the number of nodes in the visible layer. Such initial data string can be processed by appending a number of values equal to 1 at the end of the string in order to match the total number of nodes in the visible layer. The resulting string of values may be a training data configuration, i.e. a number of values such that a respective value is associated with each node in the visible layer.

A neural network can be provided with a training data probability distribution $P_{TD}$. Each training data configuration can occur with a certain probability according to the training data probability distribution. For example, the training data probability distribution can be a uniform probability distribution, where each training data configuration occurs with the same probability. For example, if the training data set consists of T training data configurations, the probability of each training data configuration $t=(t_1, t_2, t_3, \ldots)$ may be 1/T, i.e. $P_{TD}(t)=1/T$. It shall be understood that a uniform distribution is only one possible example of a training data probability distribution, and that non-uniform distributions may also be considered.

The training data probability distribution $P_{TD}$ may be known. The training data probability distribution may be provided as an input of a machine learning problem. In comparison, the probability distribution $P_{SM}$ of the classical spin model associated with the neural network may depend on unknown variables, namely the weights of the connections. Further, the training data probability distribution may assign a probability to configurations involving the nodes in the visible layer only, whereas the probability distribution of the classical spin model may assign a probability to configurations which also involve the nodes of the hidden layer(s).

As described above, a training data configuration $t=(t_1, t_2, t_3, \ldots)$ can be assigned a probability $P_{TD}(t)$ according to the training data probability distribution. In addition, a training data configuration $t=(t_1, t_2, t_3, \ldots)$ can be assigned a second probability, based on the probability distribution $P_{SM}$ of the spin model. This can be understood as follows. A training data configuration $t=(t_1, t_2, t_3, \ldots)$ may be regarded as a partial configuration of the classical spins of the classical spin model, since the training data configuration assigns values $t_i$ to the nodes of the first set of nodes only, and not to the remaining nodes. One may consider the marginal probability that the training data configuration occurs as a configuration of the spins located on the first set of nodes according to the probability distribution $P_{SM}$. Mathematically, the marginal probability may be determined according to the formula $$P^{marg}(t)=\Sigma_u P_{SM}(t,u),$$

where each $u=(u_1, u_2, u_3, \ldots)$ is a configuration of the classical spins $u_i$ located outside the first set of nodes, such that the tuple (t, u) forms a "full" configuration of all spins of the classical spin model. Further, the sum is over all such configurations u, i.e. the configurations u are "summed out" in order to determine the marginal probability distribution of the training data configuration t. This marginal probability distribution is the second probability assigned to the training data configuration t.

A machine learning problem may involve the task of determining one or more unknown weights of the neural network. The weights of the neural network may be subject to certain conditions or constraints. For example, a possible condition for the weights is that the marginal probability $P^{marg}$ (t) should be at least approximately equal to the probability $P_{TD}$(t), for each training data configuration t. Thus, a task of the machine learning problem may involve determining suitable weights of the neural network such that $P^{marg}$ (t) $P_{TD}$(t) for each configuration t in the training data set.

A neural network may be subject to the condition that, for each training data configuration, the probability of the training data configuration according to the training data probability distribution $P_{TD}$ is at least approximately equal to the probability of the training data configuration according to the marginal probability distribution $P_{TD}$ of the probability distribution $P_{SM}$ of the classical spin model associated with the neural network.

Qubit Systems

Embodiments described herein involve a quantum system including a plurality of qubits, including a set of primary qubits and a set of ancillary qubits.

A qubit, as described herein, is a quantum mechanical two-level system. A qubit may include two quantum basis states |0> and |1> representing possible quantum states of the qubit. According to the superposition principle of quantum mechanics, every superposition of the form a |0>+b|1> is a possible quantum state of the qubit. Therein, a and b are complex numbers. Mathematically, a qubit may be represented by a two-dimensional vector space. A plurality of qubits may have quantum basis states corresponding to configurations in which each qubit of the plurality of qubits is either in the quantum state |0> or in the quantum state |1>. Considering, for example, a quantum system comprising five qubits, an exemplary quantum basis state for the 5 qubits may be |0>|0>|1>|0>1>, denoted for short as |00101>. The quantum state |00101> represents a configuration wherein the first, second and fourth qubit are in the quantum state |0> and the third and fifth qubit are in the quantum state |1>. For a quantum system of m qubits, there are $2^m$ quantum basis states. In view of the superposition principle, given two quantum states of the quantum system, a superposition of the quantum basis states is also a quantum state of the quantum system. For example, a superposition of the form a |00101>+b |11110>+c|11111>, with a, b and c complex numbers, is a quantum state of the quantum system. Mathematically, a quantum system consisting of m qubits can be represented by a $2^m$-dimensional vector space.

A qubit as described herein shall be understood as a physical qubit i.e. a physical system that can be described by the theory of quantum mechanics by a two-dimensional vector space as described above. Examples of qubits are provided in the following.

A quantum system, as described herein, may include or consist of a plurality of superconducting qubits, e.g. transmon or flux qubits. A superconducting qubit may include a primary and a secondary superconducting loop. Superconducting currents propagating clockwise and counter-clockwise, respectively, in the primary superconducting loop can form the quantum basis states |1> and |0> of the superconducting qubit. Further, a magnetic flux bias through the secondary superconducting loop can couple the quantum basis states |0> and |1>.

Alternatively, a quantum system as described herein may include a system of trapped ions. In this case, the quantum basis states |0> and |1> of a qubit are formed by two levels of a Zeeman- or hyperfine manifold or across a forbidden optical transition of alkaline earth, or alkaline earth-like positively charged ions, such as Ca40+.

As yet a further alternative, a quantum system as described herein may be realized using ultracold atoms, e.g. ultracold neutral Alkali atoms, which are trapped in an optical lattice or large spacing lattices from laser fields. The atoms can be evolved towards a ground state using laser cooling. The quantum basis states of a qubit are formed by the ground state of an atom and a high-lying Rydberg state. The qubits can be addressed by laser light.

As yet a further alternative, a quantum system as described herein may be realized with quantum dots. Quantum Dot Qubits may be fabricated from GaAs/AlGaAs heterostructures. The qubits are encoded in spin states, which may be prepared by adiabatically tuning the potential from a single well to a double well potential.

As yet a further alternative, a quantum system as described herein may be realized with impurities in solid-state crystals, such as NV Centers, which are point defects in diamond crystals. Other impurities are being investigated, e.g., color centers tied to chromium impurities, rare-earth ions in solid-state crystals, or defect centers in silicon carbide. NV Centers have two unpaired electrons, which provides a spin-1 ground state that allows the identification of two sharp defect levels with large life times that can be used to realize a qubit, possibly in conjunction with the surrounding nuclear spins.

Quantum System Associated with Neural Network

A neural network as described herein is associated with a quantum system. The quantum system includes a set of primary qubits and a set of ancillary qubits. The quantum system may be designed such that each node of the neural network, at least each node of the second set of nodes, at least each node of the first set of nodes or at least each node of the first and second sets of nodes is associated with a primary qubit. Further, each connection of the neural network may be associated with a pair of qubits consisting of a primary qubit and an ancillary qubit.

An example of a quantum system is shown in FIG. 5. The quantum system is associated with the neural network shown in FIG. 1b. The quantum system includes a set of primary qubits. The set of primary qubits may include primary qubits $510_1$, $510_2$, $510_3$ and $510_4$, and includes primary qubits $520_1$, $520_2$, and $520_3$ and primary qubits $515_{ij}$ where i ranges from 1 to 4 and j ranges from 1 to 3. The quantum system includes a set of ancillary qubits including ancillary qubits $550_{ij}$ where i ranges from 1 to 4 and j ranges from 1 to 3.

Each node $10_i$ of the first set of nodes ("visible layer") shown in FIG. 1b may be associated with a primary qubit $510_i$ shown in FIG. 5.

Each node $20_j$ of the second set of nodes ("hidden layer") shown in FIG. 1b may be associated with a primary qubit $520_j$ shown in FIG. 5.

Each connection $15_{ij}$ between a node $10_i$ and a node $20_j$ shown in FIG. 1b may be associated with a pair of qubits consisting of a primary qubit $515_{ij}$ and an ancillary qubit $550_{ij}$ shown in FIG. 5.

A quantum system as described herein includes a set of primary qubits and a set of ancillary qubits. The set of primary qubits may comprise at least 3 qubits, in particular at least 8 qubits. The set of primary qubits may include K qubits, wherein K is 100 or more, e.g. between 100 and 10.000, preferably even more than 10.000. The set of ancillary qubits may comprise at least 3 qubits, in particular at least 8 qubits. The set of ancillary qubits may include K' qubits, wherein K' is 100 or more, e.g. between 100 and 10.000, preferably even more than 10.000. It shall be understood that the number of qubits shown in the figures described herein are shown for illustrational and explanatory purposes, and the actual number of qubits may depart therefrom.

Figure 7:
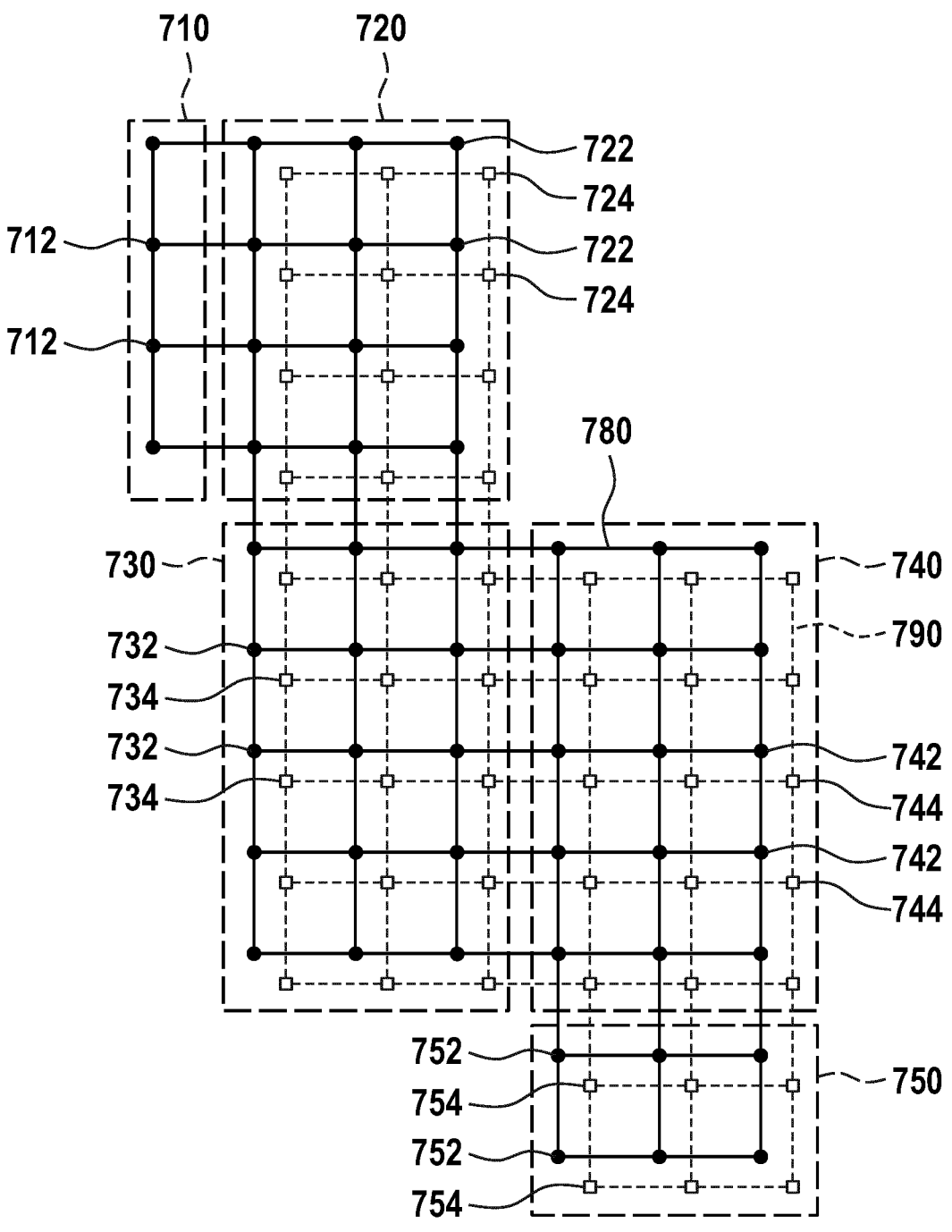
FIGS. 7-8 shows an example of a quantum system associated with a neural network as described herein.

The set of primary qubits may be arranged according to at least a portion of a first two-dimensional lattice. For example, FIG. 5 shows primary qubits arranged according to a portion of a first two-dimensional lattice 580. FIG. 7 discussed below shows primary qubits arranged according to a portion of a first two-dimensional lattice 780.

The set of ancillary qubits may be arranged according to a portion of a second two-dimensional lattice. For example, FIG. 5 shows ancillary qubits arranged according to a portion of a second two-dimensional lattice 590. FIG. 7 discussed below shows ancillary qubits arranged according to a portion of a second two-dimensional lattice 790.

A lattice, such as e.g. a 2-dimensional lattice, may include a plurality of nodes or vertices spatially arranged according to a regular grid. For example, in FIG. 5, the primary qubits, represented by black dots, correspond to the vertices of a (portion of a) first 2-dimensional lattice 580. The ancillary qubits, represented by squares, correspond to the vertices of a (portion of a) second 2-dimensional lattice 590.

A two-dimensional lattice is a planar structure, which has the advantage of providing a simpler spatial arrangement of the qubits as compared to, e.g., a 3-dimensional lattice or some irregular spatial arrangement.

A two-dimensional lattice may include a plurality of plaquettes. A plaquette can be understood as a set of qubits, e.g. a set of four qubits, forming a rectangle or square. For example, a plaquette may consist of four qubits arranged at the four corners of the plaquette. For example, in FIG. 5, the four primary qubits $520_1$, $520_2$, $515_{12}$ and $515_{11}$ form a plaquette of the first two-dimensional lattice 580. As another example, the four ancillary qubits $550_{11}$, $550_{12}$, $550_{22}$ and $550_{21}$ form a plaquette of the second two-dimensional lattice 590.

A quantum system can include one or more auxiliary qubits for "completing" the first and/or second two-dimensional lattice. For example, as shown in FIG. 5, the set of primary qubits can include an auxiliary qubit 585 which completes the plaquette in the upper left corner of the first two-dimensional lattice 580. That is, by adding the auxiliary qubit 585, the qubits 585, $520_1$, $515_{11}$ and $510_1$ form a plaquette.

According to some embodiments described herein, each node of the first set of nodes may be associated with a primary qubit. Each node of the second set of nodes may be associated with a primary qubit.

A primary qubit which is associated with a node of the neural network can be understood in the following sense. As described above, an i-th node may be associated with a classical spin $s_i$ located at the i-th node. Each spin $s_i$ may have a state, which can be a numerical value, e.g. $s_i \in \{-1, 1\}$. An association between the i-th node of the neural network and a primary qubit of the quantum system can entail that a correspondence, or encoding, is provided, between the possible states of the spin $s_i$ located at the i-th node and possible quantum states of the qubit in question. In other words, each state of the classical spin $s_i$ is encoded as a possible quantum state of the qubit, particularly a quantum basis state. By way of such encoding, if the qubit in question is in a certain quantum state (which can be revealed by measuring the qubit in question), a corresponding state of the classical spin $s_i$ can be inferred. For example, a possible encoding may involve that the state $s_i=1$ is taken to correspond to the quantum state $|0\rangle$ and that the state $s_i=-1$ is taken to correspond to the quantum state $|1\rangle$. Accordingly, if the qubit in question is in the state $|0\rangle$, it can be inferred that the state of the classical spin $s_i$ is equal to 1. Similarly, if the qubit in question is in the state $|1\rangle$, it may be inferred that the state of the associated classical spin $s_i$ is −1.

Particularly, every node in the first set of nodes (visible layer) may be associated with a primary qubit. In this way, a training data configuration $t=(t_1, t_2, t_3, \ldots)$ of the neural network can be encoded into a quantum state which may involve the primary qubits corresponding to the visible layer only (i.e. the "data qubits" as described herein). For example, the quantum state encoding the training data configuration $t=(t_1, t_2, t_3, \ldots)$ may have the form $|\tau_1\rangle|\tau_2\rangle|\tau_3\rangle \ldots$, wherein $|\tau_i\rangle=|0\rangle$ if $t_i=1$ and $|\tau_i\rangle=|1\rangle$ if $t_i=-1$.

Figure 6:
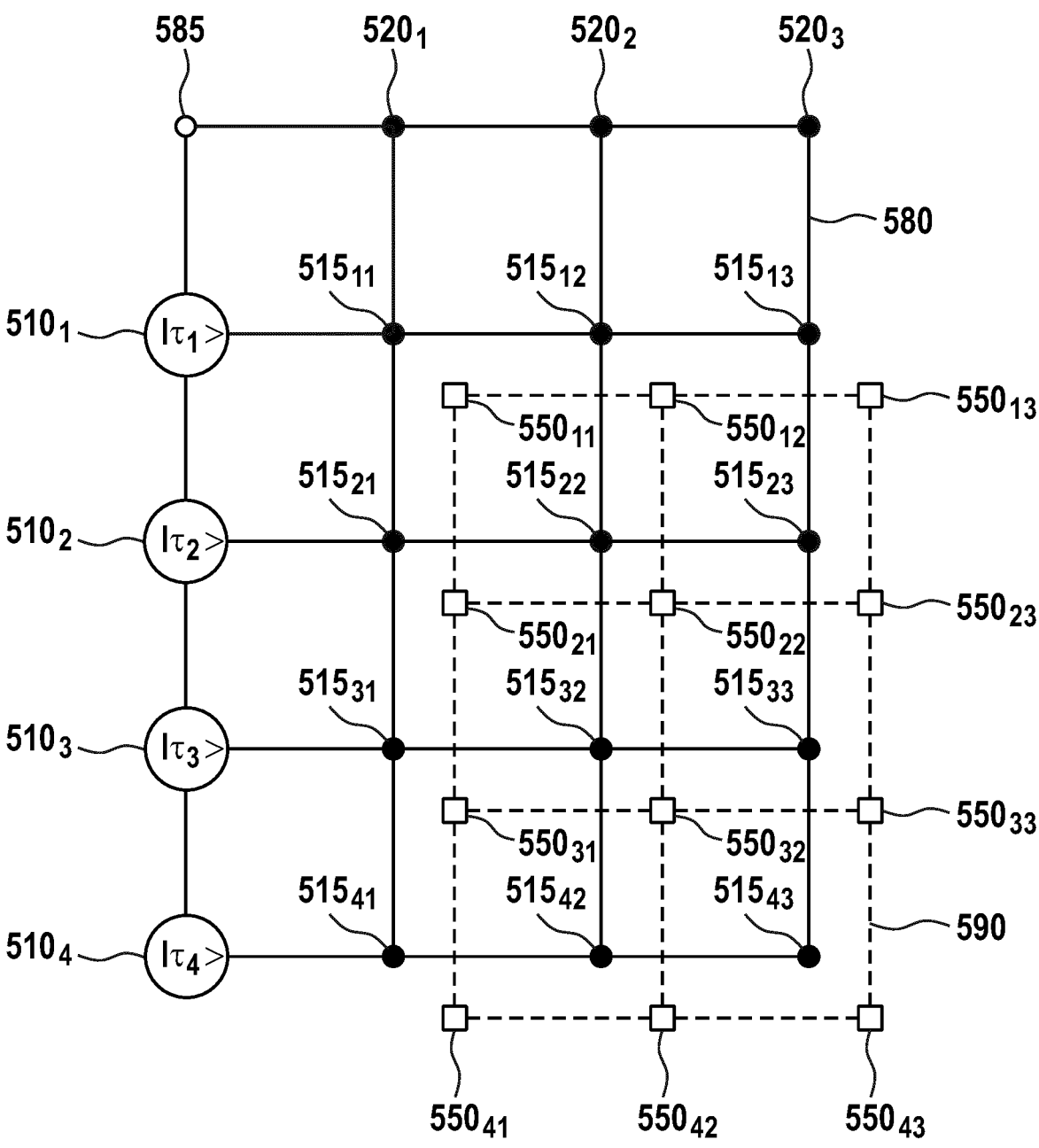
FIG. 6 shows an example of a quantum system with a target state for the set of data qubits as described herein.

For example, referring to FIG. 5 in combination with FIG. 1b, the primary qubit (data qubit) $510_i$ may be associated with the node $10_i$. Each state of the classical spin located at the node $10_i$ may be encoded as a corresponding quantum state of the primary qubit $510_i$. For example, the quantum states $|0\rangle$ and $|1\rangle$ of the primary qubit $510_i$ may encode the states 1 and −1, respectively, of the classical spin located at the node $10_i$. A training data configuration $t=(t_1, t_2, t_3, t_4)$ for the nodes $10_1$ through $10_4$ can be encoded into a quantum state of the form $|\tau_1\rangle|\tau_2\rangle|\tau_3\rangle|\tau_4\rangle$ for the qubits $510_1$ through $510_4$. This is illustrated in FIG. 6. For example, if $t=(1, 1, 1, -1)$ is an exemplary training data configuration, the corresponding quantum state encoding this training data configuration is $|0\rangle|0\rangle|0\rangle|1\rangle$.

A neural network may be associated with a classical spin model as described herein. Each node of the first set of nodes may be associated with a primary qubit. The primary qubit may be configured for encoding one or more states of the classical spin located at the node. The one or more states of the classical spin located at the node may be encoded as one or more quantum states of the primary qubit.

The present disclosure involves an association between the connections of the neural network and respective primary and ancillary qubits of the quantum system. A primary qubit which is associated with a connection between an i-th node and a j-th node of the neural network can be understood in the sense that a correspondence, or encoding, is provided between the possible values of the interaction term $s_i s_j$ of the classical spin model and possible quantum states of the primary qubit in question. Particularly, each possible value of the interaction term can correspond to a possible quantum basis state of the primary qubit in question. For example, the values $s_i$ and $s_j$ can be either 1 or −1, so that the interaction term $s_i s_j$ (i.e. the product of the values $s_i$ and $s_j$) may also be either 1 or −1. In the encoding, the value 1 may be taken to correspond to the quantum state $|0\rangle$ and the value −1 may be taken to correspond to the quantum state $|1\rangle$. If the primary qubit in question is in the state $|0\rangle$ (so that a measurement of the qubit would result in a measurement outcome 0), it may be inferred that the associated interaction term $s_i s_j$ is equal to 1. Similarly, if the primary qubit in question is in the state $|1\rangle$ (so that a measurement would result in a measurement outcome 1), it may be inferred that the associated interaction term is −1.

For example, if the primary qubit $515_{ij}$ shown in FIG. 5 is in the state $|0\rangle$ or $|1\rangle$, the interaction term $s_i s_j$ may be assigned the numerical value 1 or −1, respectively.

A neural network may be associated with a classical spin model as described herein. Each connection of the neural network may be associated with a primary qubit. The connection may be a connection between two nodes of the neural network. The primary qubit may be configured for encoding a set of possible values of an interaction between the classical spins located at the two nodes. The set of possible values of the interaction between the classical spins located at the two nodes may be encoded as a set of quantum states of the primary qubit.

An ancillary qubit which is associated with a connection between an i-th node and a j-th node can be understood in the sense that a correspondence, or encoding, is provided between the possible values of the weight $w_{ij}$ of the connection in question and possible quantum states of the qubit in question, particularly possible quantum basis states of the qubit. For example, the possible values of the weight $w_{ij}$ may be 0 and 1. The value 0 can be taken to correspond to the quantum state $|0>$ and the value 1 can be taken to correspond to the quantum state $|1>$. If the qubit in question is measured and the measurement outcome is 0, it may be determined that the associated weight $w_{ij}$ is equal to 0. Similarly, if the measurement outcome is 1, it may be determined that the associated weight $w_{ij}$ is 1.

For example, if the ancillary qubit $550_{ij}$ shown in FIG. 5 is in the state $|0>$ or $|1>$, the weight $w_{ij}$ of the connection $15_{ij}$ may be assigned the numerical value 0 or 1, respectively.

Each connection of the neural network may be associated with an ancillary qubit. The ancillary qubit may be configured for encoding the weight of the connection. A set of possible values of the weight of the connection may be encoded as a set of quantum states of the ancillary qubit. Each connection of the neural network may be associated with both a primary qubit an ancillary qubit.

The set of primary qubits can include qubits associated with the visible layer, qubits associated with connections of the neural network, and qubits associated with the hidden layer(s), as discussed in the following.

The set of primary qubits may include a subset of data primary qubits (or data qubits for short) consisting of the primary qubits associated with the first set of nodes (visible layer). For example, in FIG. 5, the subset of data qubits can be understood as the set consisting of the qubits $510_1$, $510_2$, $510_3$ and $510_4$. Each data qubit may be associated with a single node of the first set of nodes. Vice versa, each node of the first set of nodes may be associated with a single data qubit. In other embodiments, such data qubits may be absent, and the training data is input to the quantum system by two-body interactions as described herein.

The set of primary qubits may include a subset of connection-type primary qubits consisting of the primary qubits associated with the connections of the neural network. For example, in FIG. 5, the connection-type primary qubits can be understood as the qubits $515_{ij}$. Each connection-type primary qubit may be associated with a single connection. Vice versa, each connection may be associated with a single connection-type primary qubit. The subset of data primary qubits may be disjoint from the subset of connection-type primary qubits.

Each connection of the neural network may be associated with a pair of qubits, wherein the pair of qubits consists of a primary qubit and an ancillary qubit. The set of ancillary qubits may include a subset of connection-type ancillary qubits consisting of the ancillary qubits associated with the connections of the neural network. For example, in FIG. 5, the connection-type ancillary qubits can be understood as the qubits $550_{ij}$. Each connection-type ancillary qubit may be associated with a single connection. Vice versa, each connection may be associated with a single connection-type ancillary qubit. In some embodiments, each ancillary qubit may be a connection-type ancillary qubit.

The set of primary qubits may include a subset of hidden-type primary qubits. Each node of the second set of nodes (hidden layer) may be associated with a hidden-type primary qubit. For example, in FIG. 5, the subset of hidden-type primary qubits can be understood as the set consisting of the qubits $520_1$, $520_2$, and $520_3$. Each hidden-type primary qubit may correspond to a single node of the second set of nodes. Vice versa, each node of the second set of nodes may correspond to a single hidden-type primary qubit.

Likewise, each node of a further hidden layer (third set of nodes, fourth set of nodes, as described herein) may be associated with a hidden-type primary qubit.

The subset of data qubits, the subset of connection-type primary qubits and the subset of hidden-type primary qubits may be mutually disjoint sets (i.e. these sets may not have any qubit in common).

Initialization

The method as described herein includes initializing the quantum system in an initial quantum state. The initial quantum state may include, or be a (tensor) product of, single-qubit states. The initial quantum state may include a quantum state $|\alpha_i>$ for each qubit i of the quantum system. The initial quantum state may have the form $|\alpha_1>|\alpha_2>|\alpha_3>$ . . . . For example, the initial quantum state may have the form $|+>|+>|+>$ . . . wherein $|+>=(|0>+|1>)/\sqrt{2}$. It shall be understood that the initial quantum state need not have the form $|\alpha_1>|\alpha_2>|\alpha_3>$ . . . i.e. the initial quantum state need not be a product of single-qubit quantum states. The initial quantum state may be an arbitrary separable or entangled state.

The quantum system can be initialized by cooling the quantum system (using a cooling device), by unitary evolution (e.g. using a quantum processing device as described herein), by performing a measurement (using a measurement device as described herein) and the like, or a combination thereof.

Each round of the N rounds of operations may include preparing an initial quantum state for the round in question. That is, each round may include an initialization step. The initialization performed in a given round may be performed before the sequence of unitary operations of the round in question is applied. The initial quantum state may be the same for all of the N rounds of operations. For example, the initial quantum state for each round may be the quantum state wherein each qubit of the plurality of qubits in the state $|+>=(|0>+|1>)/\sqrt{2}$. Alternatively, different initial quantum states may be prepared for different rounds of operations.

Encoding the Training Data in Input Qubits

The method as described herein includes, for each training data configuration of a number of training data configurations taken from the training data set, encoding the training data configuration in input qubits that form a subset of the set of primary qubits.

Each training data configuration of the number of training data configurations may be obtained by randomly sampling the training data set, e.g. according to the training data probability distribution $P_{TD}$ as described herein. The number of training data configuration taken from the training data set may be a set sampled from the training data set. The number of training data configurations may include a first, second, third, fourth, fifth training data configuration. The number of training data configurations may include may include 10 or more, 100 or more, or 1000 or more training data configurations, wherein each training data configuration may be obtained by randomly sampling the training data set as described herein. The number of training data configurations may include M training configurations, wherein M is larger than the size of the training data set, e.g. M may be two times, 10 times, or 10000 times as large as the size of the training data set. The number of training data configurations may include multiple occurrences of a same training data configuration.

By sampling the training data set according to the training data probability distribution $P_{TD}$, the side condition "$P_{marg}(t) \approx P_{TD}(t)$" can be incorporated, i.e. the resulting weights computed by the method described herein will satisfy the side condition in question, so that it can be ensured that the training of the neural network is performed subject to the desired side conditions.

The method described herein includes encoding training data configurations in input qubits that form a subset of the set of primary qubits. A training data configuration may be encoded in the input qubits by providing an interaction between each input qubit and an external entity (e.g. one or more fields, such as magnetic fields) or by providing a interactions between groups (e.g. pairs) of input qubits. A training data configuration may be encoded in the input qubits by biasing the input qubits towards a target quantum state of the input qubits.

In some embodiments, each node of the first set of nodes is associated with a primary qubit (data qubit), such as e.g. the qubits $510_1$, $510_2$, $510_3$ and $510_4$. The input qubits may be the data qubits. Encoding a training data configuration in the input qubits may include biasing the data qubits towards a target quantum state, wherein the target quantum state of the data qubits encodes the training data configuration in question.

As described herein, a training data configuration $t=(t_1, t_2, t_3, \ldots)$ may be encoded into a target quantum state which may involve the data qubits. A training data configuration can include a plurality of numerical values L. Each numerical value $t_1$ may be assigned to a node i of the first set of nodes. Each numerical value $t_1$ may correspond to, or be encoded in, a quantum basis state of the primary qubit associated with the node i. For example, the numerical value "1" can be encoded in the quantum basis state $|0\rangle$ and the numerical value "−1" can be encoded in the quantum basis state $|1\rangle$. The target quantum state can include or be a product of single-qubit quantum states. For example, for a training data configuration $t=(t_1, t_2, t_3)$, the associated target quantum state may have the form $|\tau_1\rangle|\tau_2\rangle|\tau_3\rangle \ldots$, wherein $|\tau_i\rangle=|0\rangle$ if $t_i=1$ and $|\tau_i\rangle=|1\rangle$ if $t_i=-1$. The state $|\tau_i\rangle$ is a quantum state of the i-th data qubit.

That the data qubits are biased towards a target quantum state can be understood in the sense that, for example under the influence of one or more magnetic fields, the primary qubits in question are put in a quantum state which lies in the vicinity of, i.e. which approximates, the target quantum state. For example, a strong magnetic field acting on each primary qubit in question may accomplish this. The more accurately the quantum state approximates the target quantum state, the better the performance of the machine learning method will be. Yet, some tolerance is acceptable, i.e. the quantum state need not be identical to the target quantum state.

The primary qubits associated with the first set of nodes, i.e. the data qubits, can be biased towards a target quantum state by applying one or more fields to the data qubits. The one or more fields may include one or more magnetic fields, one or more electric fields, one or more electromagnetic fields, such as fields generated by lasers or microwaves, or a combination thereof. Additionally or alternatively, the biasing can be obtained by applying one or more phase shifts resulting from mechanical deformations.

The data qubits can be biased towards a target quantum state by applying one or more two-body interactions to the data qubits. The two-body interaction(s) may be formed from Pauli operators $\sigma_z \otimes \sigma_z$ acting on pairs of data qubits. The two-body interaction(s) may have an interaction strength expressed by a parameter having an absolute value and a sign (called sign of the two-body interaction herein). The one or more two-body interactions may be configured to bias pairs of data qubits towards respective target states which encode the training data configuration $t=(t_1, t_2, t_3, \ldots)$.

At least some of the N rounds of operations may be performed while the primary qubits associated with the first set of nodes are biased towards the target state. In other words, the qubits in question may be biased towards the target state over a period of time, during which at least some of the N rounds of operations are applied. This can provide an improved approach for training the neural network. By performing the iterative rounds of operations while biasing the quantum system towards the target state that encodes a training data configuration, the condition "$P^{marg}(t) \approx P_{TD}(t)$" can be enforced in the quantum system during the iterative procedure. The iterative procedure minimizes the energy of the state of quantum system under this side condition. Accordingly, the resulting weights computed by the method described herein will satisfy the side condition in question, i.e. it can be ensured that the training of the neural network is performed subject to the desired side conditions.

In other embodiments, the input qubits may be primary qubits other than the primary qubits associated with the first and second sets of nodes. Primary qubits associated with the first set of nodes, i.e. data qubits, may be absent, thereby reducing the number of qubits used in the method. The input qubits may be connection-type primary qubits. For instance, the connection-type primary qubits $515_{11}$, $515_{21}$, $515_{31}$ and $515_{41}$ shown in FIG. 5 may be the input qubits. The primary qubits $510_1$, $510_2$, $510_3$ and $510_4$ may be absent. One or more interactions, e.g. two-body interactions, may be applied to the input qubits. The two-body interaction(s) may be formed from Pauli operators $\sigma_z \otimes \sigma_z$ acting on pairs of input qubits. The two-body interaction(s) may have an interaction strength expressed by a parameter having an absolute value and a sign (called sign of the two-body interaction herein). The one or more two-body interactions may be configured to bias pairs of input qubits towards respective target states which encode the training data configuration $t=(t_1, t_2, t_3, \ldots)$. For instance, two-body interactions may act on the pairs $(515_{11}, 515_{21})$, $(515_{21}, 515_{31})$, $(515_{31}, 515_{41})$ of input qubits, which are shown in FIG. 5, or on any of the on the pairs $(515_{1j}, 515_{2j})$, $(515_{2j}, 515_{3j})$, $(515_{3j}, 515_{4j})$ for $j=1 \ldots 3$. The sign of each two-body interaction may depend on the parity of corresponding pairs of elements of the training data configuration. For instance, the training data configuration $t=(t_1, t_2, t_3, t_4)$ has elements $t_1, t_2, t_3, t_4$, and the parity of two elements is the product thereof (e.g., $t_1 t_2$) which determines the sign of the two-body interaction. The two-body interactions may have the form $(t_1 t_2)C \; \sigma_z^{11} \otimes \sigma_z^{21}, \ldots, (t_3 t_4)C \; \sigma_z^{31} \otimes \sigma_z^{41}$, or $(t_1 t_2)C \; \sigma_z^{1j} \otimes \sigma_z^{2j}, \ldots, (t_3 t_4)C \; \sigma_z^{3j} \otimes \sigma_z^{4j}$ for any $j=1 \ldots 3$, wherein $\sigma_z^{11}$ acts on qubit $515_{11}$, and so on. The two-body interactions may be applied over a period of time, during which at least some of the N rounds of operations are applied.

Number of Rounds

The N rounds of operations may include 2 or more, particularly 10 or more, more particularly 1000 or more rounds of operations.

Sequence of Unitary Operations of the N Rounds

Embodiments described herein involve a unitary operator, or unitary operation, acting on a quantum system. A unitary operator is an operator (matrix) acting on the quantum system. A unitary operator corresponds to a coherent time evolution of a quantum system. If the quantum system is initially in a state $|\psi\rangle$, applying a unitary operator U to the quantum system means that the state of the quantum system after the unitary operator has been performed is $U|\psi\rangle$.

Embodiments described herein involve a Hamiltonian operator acting on the quantum system, simply called Hamiltonian herein. A Hamiltonian of a quantum system can represent an interaction or a plurality of interactions for the quantum system. Eigenvalues of a Hamiltonian correspond to an energy spectrum of the quantum system. The ground state of a Hamiltonian is the quantum state of the quantum system with minimal energy. The ground state of a Hamiltonian may be thought of as a quantum state at zero temperature.

If H is a Hamiltonian of the quantum system, the operator exp(itH) is a unitary operator. Therein, t is a time parameter, i is the imaginary unit, and exp($\cdot$) is the exponential function. A unitary operator of the form exp(itH) shall be referred to herein as a unitary time evolution according to the Hamiltonian H. Evolving the quantum system by a unitary time evolution exp(itH) of a Hamiltonian H may include switching on an interaction between the plurality of qubits of the quantum system, wherein the interaction is defined by the Hamiltonian H. The interaction may be switched on for a time period t. The interaction may be switched off after the time period t has elapsed.

At least a small amount of noise may be present in the system. A unitary operator, such as a unitary time evolution of a Hamiltonian, need not be performed with 100% accuracy. It shall be understood that the term "unitary operator" also encompasses approximately unitary operators which are performed within a small margin of error, i.e. unitary operators performed in the present of small amounts of noise.

A sequence of unitary operators, as described herein, may be understood as an ordered list $U_1, U_2, \ldots$, wherein each $U_i$ is a unitary operator. As described herein, each round of the N rounds of operations includes evolving the quantum system by applying the sequence of unitary operators of that round to the quantum system. Applying a sequence of unitary operators to the quantum system means that all unitary operators in the sequence are applied to the quantum system in the order prescribed by the sequence of unitary operators. Applying the sequence of unitary operators to the quantum system corresponds to evolving the quantum system by a total unitary operator being the product of all unitary operators in the sequence of unitary operators. The product is carried out in the order prescribed by the sequence.

For each of the N rounds of operations, the sequence of unitary operators of a round may include 2 or more, particularly 5 or more, more particularly 200 or more unitary operators.

Short-Range Unitary Operators

Each unitary operator in the sequence of unitary operators of each of the N rounds may be a short-range unitary operator. The terminology of a "short-range unitary operator" refers to a unitary operator acting only on a subgroup of the qubits, wherein any two qubits within the subgroup of qubits are distanced from each other by a distance of at most an interaction cut-off distance of the quantum system. The short-range unitary operator does not act on any qubit outside of the subgroup of qubits. The subgroup of qubits may include one or more qubits. Mathematically, a short-range unitary operator has at least approximately the form $A=A'\otimes I$, wherein $\otimes$ is the tensor product, A' is a unitary operator acting on the subgroup of qubits, and I is the identity operator acting on all qubits outside of the subgroup of qubits.

An interaction cut-off distance, as described herein, may be a constant distance. The interaction cut-off distance may be much smaller than a maximal qubit distance between the qubits of the quantum system. For example, the interaction cut-off distance may be 30% or less of the maximal qubit distance, in particular 20% or less, more particularly 10% or less.

For a plurality of qubits arranged according to a lattice, a short-range unitary operator may be an r-range unitary operator. For example, r may be from 1 to 5, e.g. $r=\sqrt{2}, 2, 3, 4$ or 5. An r-range unitary operator may be a unitary operator acting only on a subgroup of qubits of the plurality of qubits, wherein any pair of qubits within the subgroup of qubits are distanced from each other by a distance of at most r times an elementary distance (lattice constant) of the lattice.

For example, in FIG. 5, the elementary distance or lattice constant of the first two-dimensional lattice 580 may be given by the distance between two adjacent primary qubits of the first two-dimensional lattice 580, e.g. the distance between qubits $520_1$ and $520_2$. Accordingly, the distance between, e.g., qubits $520_1$ and $520_3$ is two times the elementary distance, the distance between qubits $520_1$ and $515_{31}$ is three times the elementary distance, and the distance between qubits $520_1$ and $515_{12}$ is $\sqrt{2}$ times the elementary distance. Accordingly, a unitary operator acting only on qubits $520_1$ and $520_3$ is an r-range operator with $r=2$, a unitary operator acting only on qubits $520_1$ and $515_{31}$ is an r-range operator with $r=3$, and a unitary operator acting only on qubits $520_1$ and $515_{12}$ is an r-range operator with $r=\sqrt{2}$.

Irrespective of the number of qubits in the quantum system, an operator acting only on two qubits in the quantum system, wherein the two qubits are adjacent qubits ("nearest-neighbor" qubits) of the quantum system, shall be regarded as a short-range unitary operator. For a plurality of qubits arranged on a (portion of) a 2-dimensional lattice, the distance between two adjacent qubits may be equal to an elementary distance (lattice constant) of the 2-dimensional lattice. For example, in FIG. 5, qubits $520_1$ and $520_2$ are two adjacent qubits of the first two-dimensional lattice 580. An operator acting only on qubits $520_1$ and $520_2$ is an example of a short-range operator.

Irrespective of the number of qubits in the quantum system, a single-body unitary operator shall be regarded as a short-range unitary operator. A single-body unitary operator is an operator acting on a single qubit of the quantum system, e.g. the i-th qubit. Mathematically, a single-body unitary operator has the form $A=A'\otimes I$, wherein A' is an operator acting on a single qubit, and I is the identity operator acting on all qubits except for the single qubit.

Adaptive Rounds

In some implementations, the method includes a feed-forward of information, wherein the sequence of unitary operators to be applied in a round of operations may depend on measurement outcomes of measurements performed in one or more previous rounds of operations. The N rounds of operations may include one or more adaptive rounds of operations. For each adaptive round of operations, the unitary operators of the sequence of unitary operators of the adaptive round are determined based on at least one measurement outcome of a measurement performed in a previous round of the N rounds of operations.

The one or more adaptive rounds of operations may include a first adaptive round of operations. A method according to embodiments described herein may include processing, e.g. by a classical computing system as described herein, one or more measurement outcomes of a round of operations preceding the first adaptive round of operations. The method may include determining, e.g. by the classical computing system, the sequence of unitary operators of the first adaptive round of operations in response to the processing of the one or more measurement outcomes of the round of operations preceding the first adaptive round of operations.

In some implementations, the sequence of unitary operators to be applied in an adaptive round may depend on measurement outcomes of two previous rounds of operations. The method may include processing, e.g. by a classical computing system, measurement outcomes of two rounds of operations preceding the first adaptive round of operations. The method may include determining, e.g. by the classical computing system, the sequence of unitary operators of the first adaptive round of operations in response to the processing of the measurement outcomes of the two rounds of operations preceding the first adaptive round of operations.

The one or more adaptive rounds of operations, as described herein, may be a plurality of adaptive rounds. The plurality of adaptive rounds may include 2 or more, in some cases up to 10000 or more adaptive rounds.

Measurement

According to embodiments, each round of the N rounds of operations includes performing a measurement of at least a portion of the quantum system. The measurement can be performed by a measurement device as described herein. For each of the N rounds of operations, the measurement of the i-th round may be performed after applying the sequence of unitary operators of the i-th round.

One or more qubits of the quantum system can be measured. The one or more qubits may be measured individually. Performing a measurement of one or more qubits may include measuring a Pauli operator, e.g. the Pauli operator $\sigma_z$, for each of the one or more qubits. Performing a measurement of the one or more qubits may include performing a two-outcome measurement for each of the one or more qubits. A two-outcome measurement may provide one of two possible outcomes, e.g. 0 or 1.

A same measurement may be performed for at least two rounds of the N rounds of operations. In other words, one or more quantum observables can be measured for a first round of the N rounds of operations, and the one or more quantum observables can also be measured for a second round of the N rounds of operations. Performing a same measurement for several rounds of operations can allow comparing measurement outcomes of the same measurement for different rounds of operations. For example, as described herein, the energy of quantum states generated by different sequences of unitary operations can be compared with each other.

For a quantum system including a plurality of K superconducting qubits, the qubit states $|0>$ and $|1>$ for the plurality of qubits can be measured with high fidelity using a measurement device including a plurality of superconducting quantum interference devices, in particular K hysteretic DC superconducting quantum interference devices and K RF superconducting quantum interference device latches controlled by bias lines, wherein the number of bias lines scales according to $\sqrt{K}$.

For a quantum system realized with trapped ions, a measurement of the quantum system can be performed by fluorescence spectroscopy. Therein, ions are driven on a transition with short lifetime if they are in one of the two spin states. As a result, the ions in the driven state emit many photons, while the other ions remain dark. The emitted photons can be registered by CCD cameras. Measurement in any of the directions on the Bloch sphere is achieved by appropriate single-qubit pulses prior to the fluorescence spectroscopy.

For a quantum system realized with cold atoms, the qubits can be measured by performing a selective sweep of ground state atoms and fluorescence imaging with single site resolutions.

For a quantum system realized with quantum dots, the qubits can be read out from a pulse sequence by rapid adiabatic passage.

Comparison of Energy Measurements

The N rounds of operations may include a round R1 of operations. Applying the sequence of unitary operators of the round R1 may result in a first quantum state of the quantum system. For example, $|\psi_{in}>$ may denote the initial quantum state of the round R1 and $U_1$ may denote the unitary operator being the product of all unitary operators in the sequence of unitary operators of the round R1. Then $|\psi_1>=U_1|\psi_{in}>$ may be the first quantum state of the quantum system.

A method according to embodiments described herein may include measuring an energy, particularly an average energy or expected energy, of the first quantum state. The energy may be measured by a measurement device as described herein. Measuring an energy of the first quantum state may include measuring a Hamiltonian of the quantum system. Measuring an energy of the first quantum state may include measuring an expectation value of a Hamiltonian of the quantum system. The expectation value of a Hamiltonian H may be represented as $<\psi_1|H|\psi_1>$. Measuring an energy of the first quantum state may include measuring the total Hamiltonian, as described herein, of the quantum system.

The measurement of an energy can be performed by measuring the qubits in the system individually, e.g. measurement of the Pauli operator $\sigma_z$. Based on the measurement outcomes resulting from such measurements, the energy can be computed, e.g. by a classical computing system as described herein.

The N rounds of operations may include a round of operations R2 performed after the round R1. Applying the sequence of unitary operators of the round R2 may result in a second quantum state of the quantum system. For example, $|\psi_{in}>$ may also be the initial quantum state of the round R2, i.e. the same initial state as the round R1, and $U_2$ may denote the unitary operator being the product of all unitary operators in the sequence of unitary operators of the round R2. Then $|\psi_2>=U_2|\psi_{in}>$ may be the second quantum state of the quantum system.

A method according to embodiments described herein may include measuring an energy, particularly an average energy or expected energy, of the second quantum state. The energy can be measured by a measurement device as described herein. Measuring an energy of the second quantum state may include measuring a Hamiltonian of the quantum system. Measuring an energy of the second quantum state may include measuring an expectation value of a Hamiltonian of the quantum system. The measured Hamiltonian for the first quantum state may be the same as the measured Hamiltonian for the second quantum state. Measuring an energy of the second quantum state may include measuring a total Hamiltonian of the quantum system.

The method may include comparing, e.g. by the classical computing system, the energy of the first quantum state with the energy of the second quantum state. The method may include determining, e.g. by the classical computing system, a sequence of unitary operators to be applied in a round R3 of the N rounds of operations, wherein the round R3 is to be performed after the round R2. The sequence of unitary operators to be applied in the round R3 may be determined based at least on the comparison of the energy of the first quantum state with the energy of the second quantum state.

For example, if the comparison of the energy of the first quantum state with the energy of the second quantum state reveals that the energy of the first quantum state is smaller than the energy of the second quantum state, the operator or the classical computing system may conclude that the first quantum state is closer to the minimal energy state of the measured Hamiltonian than the second quantum state. In light thereof, the operator or the classical computing system may reject the sequence of unitary operators of the round R2 and return to the sequence of unitary operations of the round R1. Starting from the sequence of unitary operations of the round R1, the operator or classical computing system may make a small perturbation to said sequence, e.g. by varying a parameter of the operators (e.g. the parameter $\beta$, $\Omega$, $\alpha$ or $\tau$ as described above) from said sequence by a small amount. The resulting sequence may be the sequence of unitary operators to be applied in the round R3.

Alternatively, if the comparison of the energy of the first quantum state with the energy of the second quantum state reveals that the energy of the first quantum state is larger than (or equal to) the energy of the second quantum state, the operator or the classical computing system may conclude that the second quantum state is closer to the ground state of the measured Hamiltonian than the first quantum state. In light thereof, the operator or the classical computing system may accept the sequence of unitary operators of the round R2. Starting from the sequence of unitary operations of the round R2, the operator or the classical computing system may make a small adjustment or perturbation to said sequence. The resulting adjusted sequence may be the sequence of unitary operators to be applied in the round R3.

The method can proceed in a similar manner throughout all rounds of operations: (i) measure the energy of the quantum state obtained after applying the sequence of unitary operations of the current round of operations; (ii) compare the measured energy of the current round with a measured energy of a previous round; (iii) if the measured energy of the current round is larger than the measured energy of the previous round, reject the sequence of unitary operators of the current round and accept the sequence of unitary operations of the previous round; alternatively, if the measured energy of the current round is smaller than the measured energy of the previous round, accept the sequence of unitary operations of the current round; (iv) starting from the accepted sequence of unitary operations, perturb at least one parameter of a unitary operator of said accepted to obtain a sequence of operations for a next round of operations.

As the number N of rounds is increased, an increasingly larger set of quantum states is prepared, wherein the energy of subsequent quantum states is non-increasing and will gradually decrease. Accordingly, the energy gradually approaches the minimal energy of the measured Hamiltonian. As described herein, the N rounds of operations may be performed while a training data configuration is encoded into the quantum system, for example by applying one or more fields which bias the data qubits towards a target state encoding a training data configuration. In doing so, the quantum system is driven to a quantum state of low energy subject to the condition that the data qubits are biased towards the target state in question. This can be understood as a lowest energy search under a side condition which keeps part of the system in a fixed state. The fixed part of the quantum system acts as an effective local field on the dynamical part. By repeating this process for suitably many training data configurations, this approach drives the ancillary qubits towards a quantum state which encodes the solution to the machine learning problem, i.e. a quantum state which, when measured, can reveal the initially unknown weights of the neural network, while guaranteeing that the condition $P^{marg}(t) \approx P_{TD}(t)$ is satisfied for each training data configuration t in the training data set.

Although an example of a method is given above wherein the energy is measured in a plurality of adaptive rounds of operations, in alternative embodiments the energy may be measured without having adaptive rounds of operations. For example, the method may include non-adaptive rounds only, wherein in each round of operations the energy of a Hamiltonian is measured. After all N rounds have been performed, the different measured energies can be compared with each other and the lowest can be selected.

Form of the Hamiltonian

As described herein, a measurement of the quantum system may be an energy measurement. The measurement may be a measurement of a Hamiltonian of the quantum system. The Hamiltonian may have a particular form, as described in the following.

The measurement performed in each of the N rounds of operations may be a measurement of a short-range Hamiltonian. A short-range Hamiltonian may refer to a Hamiltonian representing interactions of a plurality of qubits, wherein no interactions occur between qubits which are distanced from each other by a distance greater than an interaction cut-off distance of the quantum system. For a plurality of qubits arranged according to a lattice, a short-range Hamiltonian may be a Hamiltonian, wherein no interactions occur between qubits which are distanced from each other by a distance greater than r times an elementary distance (lattice constant) of the lattice. For example, r may be from 1 to 5, e.g. $r = \sqrt{2}$, 2, 3, 4 or 5. Irrespective of the number of qubits of the quantum system, a plaquette Hamiltonian shall be regarded as a short-range Hamiltonian.

A Hamiltonian measured in a round of operations may be a d-body Hamiltonian, wherein d is 2, 3, 4, 5, 6, 7 or 8. A d-body Hamiltonian may refer to a Hamiltonian representing interactions of the plurality of qubits, wherein no joint interactions occur between groups comprising d+1 or more qubits, or at least such interactions are negligible. A d-body Hamiltonian may involve interactions between groups comprising d or less qubits. A d-body Hamiltonian may be the sum of a plurality of summand Hamiltonians, wherein each summand Hamiltonian represents a joint interaction between a group of d qubits or less. Each summand Hamiltonian may have the form $A \otimes I$ (at least approximately) where A is an operator acting on d or less qubits, and I is the identity operator acting on the remainder of the quantum system.

A Hamiltonian, particularly a short-range Hamiltonian, measured in a round of operations may include a first sum including a plurality of first summand Hamiltonians. Each first summand Hamiltonian may act at least on a primary qubit and an ancillary qubit.

Each first summand Hamiltonian may act on a primary qubit and an ancillary qubit associated with a same connection of the neural network. For example, with reference to FIG. 5, a first summand Hamiltonian may act on a primary qubit 515, j and an ancillary qubit $550_{ij}$, which are both associated with the connection between nodes $510_i$ and $520_j$ of the neural network shown in FIG. 1b.

Each first summand Hamiltonian may be a two-body Hamiltonian. Each first summand Hamiltonian may have the form $A \otimes B$ where A acts on a primary qubit and B acts on an ancillary qubit, e.g. a primary qubit and an ancillary qubit associated with a same connection. For example, each summand Hamiltonian may have the form $J\sigma_z \otimes \sigma_z$, where $\sigma_z$ is a Pauli operator and J is a coefficient.

The plurality of first summand Hamiltonians may be configured such that each primary qubit is acted upon by at most one first summand Hamiltonian. In other words, a primary qubit may be acted upon by no first summand Hamiltonian at all, or there may be one single first summand Hamiltonian acting on the primary qubit in question. The plurality of first summand Hamiltonians may be configured such that there are no two first summand Hamiltonians acting on the same primary qubit.

The plurality of first summand Hamiltonians may be configured such that each ancillary qubit is acted upon by at most one, particularly precisely one, first summand Hamiltonian. The plurality of first summand Hamiltonians may be configured such that there are no two first summand Hamiltonians acting on the same ancillary qubit.

A Hamiltonian, particularly a short-range Hamiltonian, measured in a round of operations may include a second sum including a plurality of second summand Hamiltonians. Each second summand Hamiltonian may act on a plurality of primary qubits, such as for example four primary qubits. Each second summand Hamiltonian may act fully inside the set of primary qubits. That is, each second summand Hamiltonian may act on primary qubits only. Each second summand Hamiltonian may not act on any ancillary qubit. Each second summand Hamiltonian may have the form $A \otimes I$, where A acts on one or more primary qubits and I is the identity operator acting on the set of ancillary qubits.

The primary qubits may be arranged according to a portion of a two-dimensional lattice, as shown for example in FIGS. 5 and 7. Each second summand Hamiltonian may act according to a plaquette of the two-dimensional lattice. For example, each second summand Hamiltonian may act on a plurality of primary qubits located at the corners of a square. For example, each summand Hamiltonian may have the form $C \sigma_z \leq \sigma_z \otimes \sigma_z \otimes \sigma_z$, where $\sigma_z$ is a Pauli operator, where the four Pauli operators are located at the corners of a plaquette of a two-dimensional lattice, and C is a coefficient.

A Hamiltonian measured in round of operations may be a total Hamiltonian, wherein the total Hamiltonian is equal to the first sum including the plurality of first summand Hamiltonians plus the second sum including the plurality of second summand Hamiltonians. For example, a total Hamiltonian may be a Hamiltonian of the form $$H(t) = \sum_k a_k \sigma_z^{(k,p)} \sigma_z^{(k,a)} + C(t) \sum_l C_l \sigma_z^{(l,n)} \sigma_z^{(l,e)} \sigma_z^{(l,s)} \sigma_z^{(l,w)}$$

as described above.

First and Second Rounds

Performing the N rounds of operations may include performing a plurality of first rounds of operations. Each first round may include applying a sequence of unitary operators selected from a first family of unitary operators. Each first round may include performing a measurement of at least a portion of the quantum system.

Performing the N rounds of operations may include performing a plurality of second rounds of operations. Each second round may include applying a sequence of unitary operators selected from a second family of unitary operators. The second family of unitary operators is different from the first family of unitary operators. Each second round may include performing a measurement of at least a portion of the quantum system.

The plurality of second rounds of operations may be performed after or before the plurality of first rounds of operations. There may be 2 or more, 10 or more, 100 or more or 1000 or more first rounds. There may be 2 or more, 10 or more, 100 or more or 1000 or more second rounds. The plurality of first rounds may include one or more adaptive rounds, as described herein. The plurality of second rounds may include one or more adaptive rounds.

Thus, the N rounds of operations may be split up into a plurality of first rounds and a plurality of second rounds, wherein the unitary operators applied in the first rounds are different from the unitary operators applied in the second rounds. Examples will be given below. Splitting up the N rounds in first rounds and second rounds for a suitable first and second family can improve the performance of the method, i.e. a solution to a machine learning problem can be found faster as compared to a method where the N rounds involve unitary operators all taken from the same family.

For example, each unitary operator of the first family of unitary operators may act fully inside the set of primary qubits. That a unitary operator (or, likewise, a Hamiltonian) acts fully inside the set of primary qubits can be understood in the sense that the unitary operator does not act on any ancillary qubit of the quantum system, or at least that an action of the unitary operation on the set of ancillary qubits is negligible i.e. approximately zero. A unitary operation which acts fully inside the set of primary qubits may have (approximately) the form $U \circledR I$, where U is a unitary operation acting on the set of primary qubits and I is the identity operator acting on the set of ancillary qubits.

The set of primary qubits may include data qubits, connection-type primary qubits and hidden-type primary qubits as described herein. Each unitary operation applied to the quantum system in a first round of operations, as described herein, may not act on the data qubits, or at least an action of the unitary operation on the subset of data qubits may be negligible. Each unitary operation applied in a first round may act at least on one or more connection-type primary and/or one or more hidden-type primary qubits.

In some implementations, each unitary operator of the first family of unitary operators can be a single-body unitary operator or a short-range unitary operator. The single-body unitary operator and/or the short-range unitary operator can act fully inside the set of primary qubits. A single-body unitary operator can be understood as an operator acting on a single qubit of the quantum system.

In further implementations, the primary qubits can be arranged according to a portion of a first two-dimensional lattice as described herein. Each unitary operator of the first family of unitary operators can be a single-body unitary operator or a short-range unitary operator acting according to a plaquette of the first two-dimensional lattice. The single-body unitary operator and/or the short-range unitary operator can act fully inside the set of primary qubits.

For example, a single-body unitary operator of the first family of operators may be an operator acting on a single primary qubit, wherein the operator has the form $$e^{-i\beta\sigma_x^{(j)}}.$$

Therein, $\beta$ is a parameter, $\sigma_x^{(j)}$ is a Pauli operator ("sigma-x") acting on the j-th qubit, and the index j can refer to any primary qubit, with the potential exception of the primary qubits associated with the first set of nodes (if present), i.e. all primary qubits except for the data qubits (if present).

For example, a short-range unitary operator acting according to a plaquette of the first two-dimensional lattice can have the form $$e^{-i\Omega C_l \sigma_z^{(l,n)} \sigma_z^{(l,e)} \sigma_z^{(l,s)} \sigma_z^{(l,w)}}.$$

Therein, the index 1 can refer to any plaquette of the first two-dimensional lattice, and n, e, s and w designate the four primary qubits of each 1-th plaquette. Further, $$\sigma_z^{(l,n)}, \sigma_z^{(l,e)}, \sigma_z^{(l,s)}, \sigma_z^{(l,w)}$$

are Pauli operators acting on the primary qubits n, e, s and w of the 1-th plaquette. Further, $\Omega$ and $C_1$ are parameters.

The sequence of unitary operators of each of the first rounds of operations may be a sequence of alternations of the form $A_1$, $B_1$, $A_2$, $B_2$, Each $A_k$ may be a product of two or more single-body unitary operators. Each $B_k$ may be a product of two or more short-range unitary operators, e.g. short-range operators acting according to a plaquette of the first two-dimensional lattice. Each $A_k$ and $B_k$ may act fully inside the set of primary qubits. For example, each $A_k$ may be an operator of the form $$U_x(\beta) = \Pi_j e^{-i\beta\sigma_x^{(j)}}$$

For example, each $B_k$ may be an operator of the form $$U_c(\Omega) = \Pi_l e^{-i\Omega C_l \sigma_z^{(l,n)} \sigma_z^{(l,e)} \sigma_z^{(l,s)} \sigma_z^{(l,w)}}$$

The plurality of first rounds of operations may include one or more adaptive first rounds of operations, wherein, for each adaptive first round of operations, the unitary operators of the sequence of unitary operators of the adaptive first round are determined based on at least one measurement outcome of a measurement performed in a previous first round of operations.

While the first rounds may involve unitary operators acting on the primary qubits only, the second rounds may involve at least some unitary operators acting on the ancillary qubits.

The second family of unitary operators may include one or more single-body unitary operators acting on a single ancillary qubit, for example unitary operators of the form $$e^{-i\alpha\sigma_x^{(m)}}.$$

Therein, $\alpha$ is a parameter, $\sigma_x^{(m)}$ is a Pauli operator acting on the m-th ancillary qubit, and the index m can refer to any ancillary qubit of the quantum system.

The second family of unitary operators may include one or more unitary operators acting jointly on a primary qubit and an ancillary qubit. Particularly, at least some unitary operators of the second family may act jointly on a primary qubit and an ancillary qubit associated with a same connection of the neural network. For example, with reference to FIG. 5, a unitary operator of the second family may act on a primary qubit $515_{ij}$ and an ancillary qubit $550_{ij}$, which are both associated with the connection between nodes $510_i$ and $520_j$ of the neural network shown in FIG. 1b.

For example, the second family of unitary operators may include one or more operators of the form $$e^{-i\tau\sigma_z^{(k,p)} \sigma_z^{(k,a)}}.$$

Therein, the index k can refer to any connection of the neural network, and (k,p) and (k.a) are as defined above. Further, $\tau$ is a parameter.

Each unitary operator of the second family of unitary operators may be a single-body unitary operator or a two-body unitary operator acting on a primary qubit and an ancillary qubit. A 2-body unitary operator refers to a unitary operator acting only on a subgroup including at most two qubits of the plurality of qubits. The 2-body unitary operator does not act on any qubit outside of the subgroup of qubits. Mathematically, a 2-body unitary operator has the form $U=U'\otimes I$ (at least approximately), wherein U' is a unitary operator acting on the subgroup of qubits, and I is the identity operator acting on all qubits outside of the subgroup of qubits.

The sequence of unitary operators of each of the second rounds of operations may be a sequence of alternations of the form $C_1$, $D_1$, $C_2$, $D_2$, Each $C_k$ may be a product of two or more single-body unitary operators. Each $D_k$ may be a product of two or more short-range unitary operators, e.g. short-range two-body operators each acting on a primary qubit and an ancillary qubit. For example, each $C_k$ may have the form $$U_{xa}(\alpha) = \Pi_m e^{-i\alpha\sigma_x^{(m)}}$$

where the index m ranges over all ancillary qubits of the quantum system. For example, each $D_k$ may have the form $$U_a(\tau) = \Pi_k e^{-i\tau\sigma_z^{(k,p)} \sigma_z^{(k,a)}}$$

where the index k ranges over all connections of the neural network.

The plurality of second rounds of operations may include one or more adaptive second rounds of operations, wherein, for each adaptive second round of operations, the unitary operators of the sequence of unitary operators of the adaptive second round are determined based on at least one measurement outcome of a measurement performed in a previous second round of operations.

Example of a Deep Network and Associated Quantum System

FIG. 7 shows a further example of a quantum system. The quantum system is associated with the deep neural network shown in FIG. 2.

The quantum system shown in FIG. 7 includes a set of primary qubits (black dots) arranged according to a portion of a first two-dimensional lattice 780. The quantum system includes a set of ancillary qubits (squares) arranged according to a portion of a second two-dimensional lattice 790. The first two-dimensional lattice has plaquettes. A plaquette is an elementary square of the first two-dimensional lattice having four primary qubits located at the corners of the elementary square. Likewise, a plaquette of the second two-dimensional lattice is an elementary square of the second two-dimensional lattice having four ancillary qubits located at the corners of the elementary square.

The quantum system shown in FIG. 7 includes a region 710. Each node of the first set of nodes (visible layer) of FIG. 2, i.e. nodes 210, is associated with a primary qubit 712 in the region 710. In other words, the primary qubits 712 are the data qubits. In some embodiments, the data qubits may be omitted, as described herein.

The quantum system shown in FIG. 7 includes a region 720. Each connection between the first set of nodes (i.e. nodes 210) and the second set of nodes (i.e. nodes 220) in FIG. 2 is associated with a primary qubit 722 and an ancillary qubit 724 in the region 720.

The quantum system shown in FIG. 7 includes a region 730. Each connection between the second set of nodes (i.e. nodes 220) and the third set of nodes (i.e. nodes 230) in FIG. 2 is associated with a primary qubit 732 and an ancillary qubit 734 in the region 730.

The quantum system shown in FIG. 7 includes a region 740. Each connection between the third set of nodes (i.e. nodes 230) and the fourth set of nodes (i.e. nodes 240) in FIG. 2 is associated with a primary qubit 742 and an ancillary qubit 744 in the region 740.

The quantum system shown in FIG. 7 includes a region 750. Each connection between the fourth set of nodes (i.e. nodes 240) and the fifth set of nodes (i.e. nodes 250) in FIG. 2 is associated with a primary qubit 752 and an ancillary qubit 754 in the region 750.

The qubits in the regions 720, 730, 740 and 750 are connection-type qubits as described herein.

Figure 8:
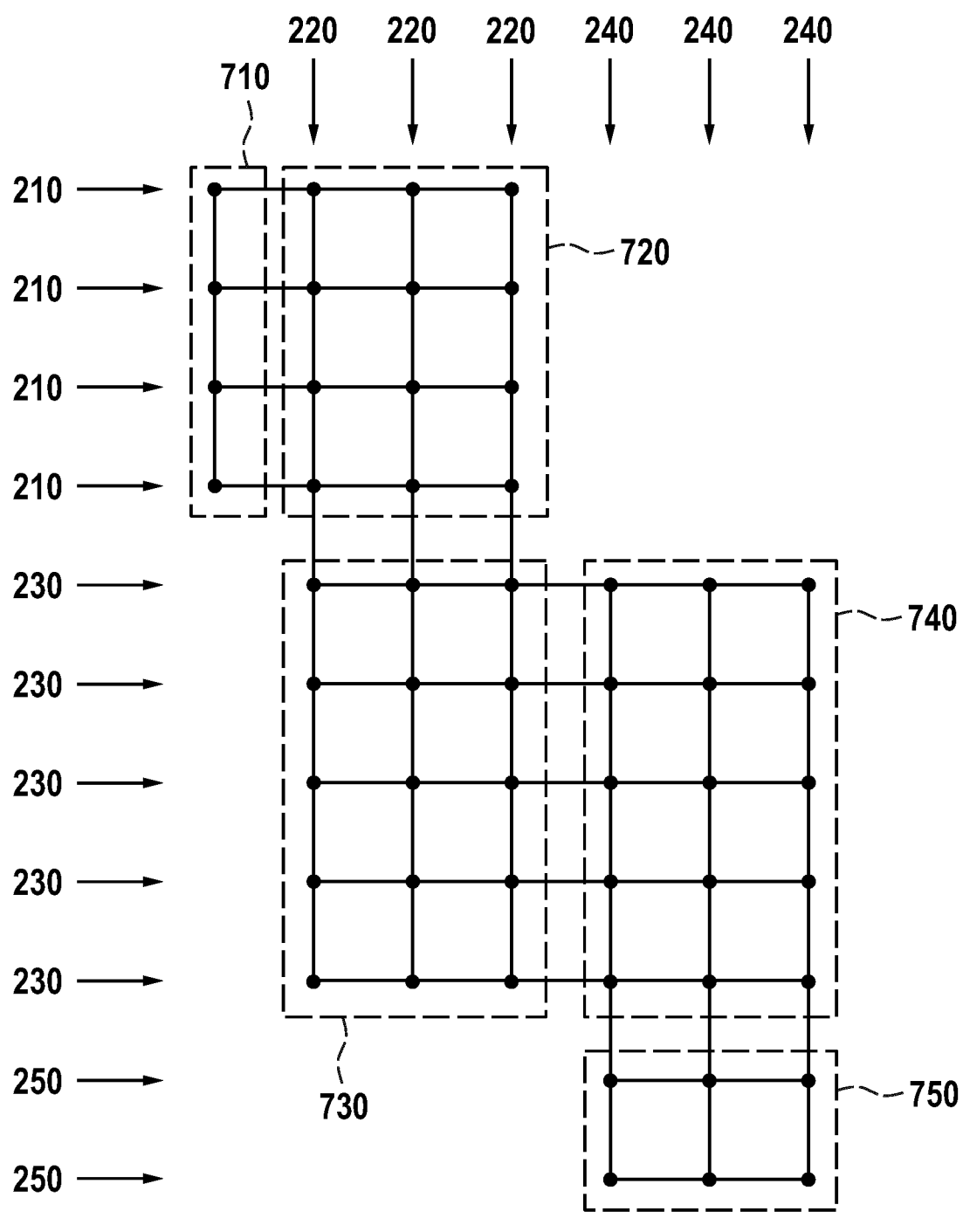

For obtaining a better understanding of the layout of the qubits in FIG. 7, reference is made to FIG. 8. FIG. 8 again shows the quantum system of FIG. 7. The black dots represent the primary qubits in the regions 710, 720, 730, 740 and 750, respectively. In order not to overload the figure, the ancillary qubits are not explicitly shown in FIG. 8. Yet, the ancillary qubits can be provided as shown in FIG. 7.

The qubits shown in FIG. 8 are arranged according to a portion of a grid (two-dimensional lattice) having horizontal lines (left-right) and vertical lines (up-down). As indicated in FIG. 8, the horizontal lines correspond to the nodes 210 (first set of nodes), 230 (third set of nodes) and 250 (fifth set of nodes) in this order when traversing the grid from top to bottom. The vertical lines correspond to nodes 220 (second set of nodes) and 240 (fourth set of nodes) in this order when traversing the grid from left to right.

The group of horizontal lines corresponding to the nodes 210 contains all primary qubits which are related to the nodes 210. This includes a) The region 710 containing the primary qubits associated with the nodes 210 (data qubits) and b) The region 720 containing the primary qubits associated with the connections between the nodes 210 and 220 (connection-type qubits). In the region 720, a primary connection-type qubit is located on each intersection between a horizontal line corresponding to a node 210 and a vertical line corresponding to a node 220.

The group of horizontal lines corresponding to the nodes 230 contains all primary qubits which are related to the nodes 230. This includes a) The region 730 containing the primary qubits associated with the connections between the nodes 220 and 230 (connection-type qubits). In the region 730, a primary connection-type qubit is located on each intersection between a horizontal line corresponding to a node 230 and a vertical line corresponding to a node 220, and b) The region 740 contains the primary qubits associated with the connections between the nodes 230 and 240. In the region 740, a primary qubit is located on each intersection between a horizontal line corresponding to a node 230 and a vertical line corresponding to a node 240.

The group of horizontal lines corresponding to the nodes 250 contains all primary qubits which are related to the nodes 250. This includes the region 750 containing the primary qubits associated with the connections between the nodes 240 and 250 (connection-type qubits). In the region 750, a primary connection-type qubit is located on each intersection between a horizontal line corresponding to a node 250 and a vertical line corresponding to a node 240.

The quantum system can include a plurality of auxiliary qubits to "complete" portions of the first and/or second two-dimensional lattice. For example, in FIG. 7, in the area to the right of region 720 and above region 740, a further set of 4×3 primary qubits can be arranged (four rows and three columns) to complete the upper right corner of the first two-dimensional lattice 780. Likewise, in the same area. a further set of 4×3 ancillary qubits can be arranged to complete the upper right corner of the second two-dimensional lattice 790. When the rounds of operations and/or measurements are performed as described herein, these auxiliary qubits may not be acted upon, or alternatively these qubits may not be coupled to the rest of the system.

A neural network as described herein may be a deep neural network. A neural network may include a third set of nodes and a plurality of connections between the second set of nodes and the third set of nodes, as described herein. Each connection between a node from the second set of nodes and a node of the third set of nodes may have a weight. Each connection between a node from the second set of nodes and a node of the third set of nodes may be both associated with a primary qubit and with an ancillary qubit. The ancillary qubits may be configured to encode the weights of the connections between the second set of nodes and the third set of nodes. After performing the rounds of operations as described herein, a measurement of the ancillary qubits can reveal the unknown weights in question.

The method described herein can include measuring, e.g. by a measurement device, one or more ancillary qubits associated with one or more connections between the second set of nodes and the third set of nodes. The method may include determining, e.g. by a classical computing system, at least one weight of a connection between the second set of nodes and the third set of nodes based on the measurement of the one or more ancillary qubits.

A neural network may include a fourth set of nodes and a plurality of connections between the third set of nodes and the fourth set of nodes, as described herein. Each connection between a node of the third set of nodes and a node of the fourth set of nodes may have a weight. Each connection between a node of the third set of nodes and a node of the fourth set of nodes may be both associated with a primary qubit and with an ancillary qubit. The ancillary qubits may be configured to encode the weights of the connections between the third set of nodes and the fourth set of nodes. After performing the rounds of operations as described herein, a measurement of the ancillary qubits can reveal the unknown weights in question.

The method described herein can include measuring, e.g. by a measurement device, one or more ancillary qubits associated with one or more connections between the third set of nodes and the fourth set of nodes. The method may include determining, e.g. by a classical computing system, at least one weight of a connection between the third set of nodes and the fourth set of nodes based on the measurement of the one or more ancillary qubits.

The primary qubits may be arranged according to at least a portion of a first two-dimensional lattice. The ancillary quits may be arranged according to at least a portion of a second two-dimensional lattice. The quantum system may include a first region (e.g. region 710 in FIG. 7) including the primary qubits associated with the first set of nodes, i.e. the data qubits. Instead of using data qubits the information of training data configurations may be input in other ways, such as by two-body interactions as described herein. The quantum system may include a second region (i.e. region 720). The second region may be adjacent to the first region along a first direction (e.g. the horizontal direction in FIG. 7). The second region may include the primary and ancillary qubits associated with the connections between the first set of nodes and the second set of nodes.

A neural network may be a deep neural network. The quantum system may include a third region (i.e. region 730). The third region may be adjacent to the second region along a second direction (e.g. the vertical direction in FIG. 7). The second direction may be different from, or perpendicular to, the first direction. The third region may include the primary and ancillary qubits associated with the connections between the second set of nodes and the third set of nodes. The quantum system may include a fourth region (i.e. region 740). The fourth region may be adjacent to the third region along the first direction (e.g. the horizontal direction in FIG. 7). The fourth region may include the primary and ancillary qubits associated with the connections between the third set of nodes and the fourth set of nodes. The quantum system may include a fifth region (i.e. region 750). The fifth region may be adjacent to the fourth region along the second direction. The fifth region may include the primary and ancillary qubits associated with the connections between the fourth set of nodes and a fifth set of nodes of the neural network.

According to a further embodiment, a method for machine learning using a quantum system is provided. The method includes providing a quantum system comprising a set of primary qubits and a set of ancillary qubits. A neural network is associated with the quantum system. The neural network includes a first set of nodes, a second set of nodes and a plurality of connections between the first set of nodes and the second set of nodes, each connection having a weight. The neural network includes a training data set comprising a plurality of configurations for the first set of nodes. Each node of the first set of nodes may be associated with a primary qubit. Each connection of the plurality of connections is both associated with a primary qubit and with an ancillary qubit. The method further includes initializing the quantum system in an initial quantum state. The method further includes, for each configuration in a set sampled from the training data set:

encoding the configuration in input qubits that form a subset of the set of primary qubits, such as by applying one or more fields to bias the primary qubits associated with the first set of nodes towards a target state, wherein the target state encodes the configuration;

performing a plurality of first rounds of operations, wherein each first round comprises: (a1) applying a sequence of unitary operators selected from a first family of unitary operators; and (a2) performing a measurement of at least a portion of the quantum system; and performing a plurality of second rounds of operations, wherein each second round comprises: (b1) applying a sequence of unitary operators selected from a second family of unitary operators, wherein the second family of unitary operators is different from the first family of unitary operators; and (b2) performing a measurement of at least a portion of the quantum system;

The method further includes performing a measurement of one or more ancillary qubits and, based at least on the measurement of the one or more ancillary qubits, determining at least one weight of a connection of the plurality of connections.

According to a further embodiment, an apparatus for performing machine learning using a quantum system is provided. The apparatus includes a quantum system comprising a set of primary qubits and a set of ancillary qubits as described herein. A neural network is associated with the quantum system. The neural network includes a first set of nodes, a second set of nodes, and a plurality of connections between the first set of nodes and the second set of nodes, each connection having a weight, as described herein. The neural network includes a training data set comprising a plurality of configurations for the first set of nodes as described herein. Each connection of the plurality of connections is both associated with a primary qubit and with an ancillary qubit. The apparatus includes a quantum processing device for evolving the quantum system according to one or more short-range unitary operators. The apparatus includes an encoding device for interacting with input qubits forming a subset of the set of primary qubits. The encoding device may be configured for applying a bias to the primary qubits associated with the first set of nodes. The apparatus includes a measurement device for measuring at least a portion of the quantum system. The apparatus is configured for initializing the quantum system in an initial quantum state. The apparatus is configured, for each configuration of a number of configurations taken from the training data set, for:

encoding, by the encoding device, the configuration in the input qubits by interacting with the input qubits, e.g., by biasing the primary qubits associated with the first set of nodes towards a target state, wherein the target state encodes the configuration; and performing N rounds of operations, wherein each round comprises: applying, by the quantum processing device, a sequence of unitary operators acting on at least a portion of the quantum system, wherein the portion may include the input qubits; and performing, by the measurement device, a measurement of at least a portion of the quantum system;

The apparatus is configured for performing, by the measurement device, a measurement of one or more ancillary qubits. The apparatus is configured for, based at least on the measurement of the one or more ancillary qubits, determining at least one weight of a connection of the plurality of connections. The at least one weight may be determined by a classical computing system comprised in the apparatus.

Figure 9:
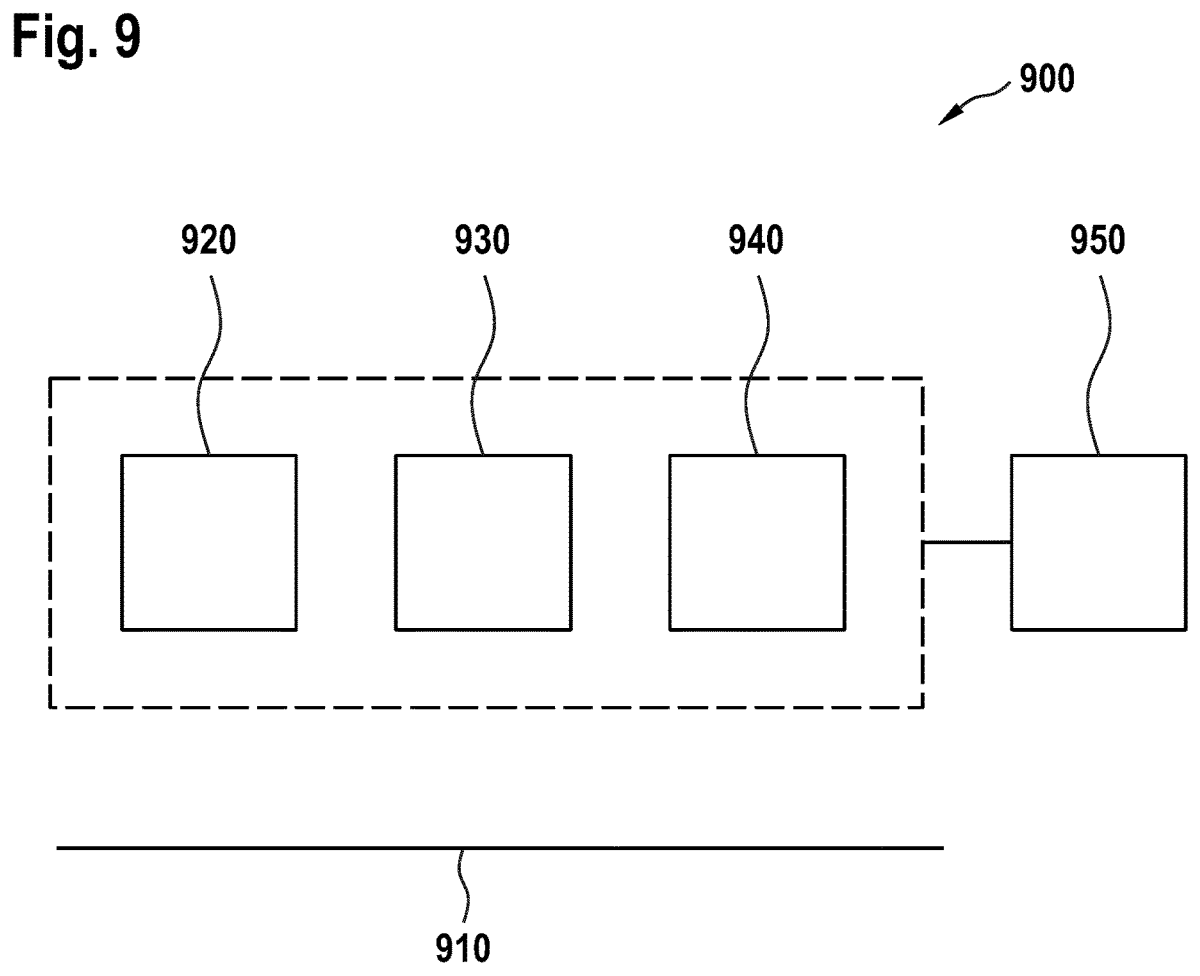

FIG. 9 shows an apparatus 900 according to embodiments described herein. The apparatus includes a quantum system 910 as described herein. The apparatus includes a quantum processing device 920 for evolving the quantum system 910 according to one or more short-range unitary operators, as described herein. The apparatus 900 includes an encoding device 930 for encoding the configuration in input qubits that form a subset of the set of primary qubits, e.g., by applying a bias to primary qubits associated with the first set of nodes, as described herein, or in another way. The apparatus 900 includes a measurement device 940 for measuring at least a portion of the quantum system 910, as described herein.

An apparatus 900 as described herein may include a classical computing system 950. The classical computing system 950 may be coupled to at least one of the quantum processing device 920, the encoding device 930 and the measurement device 940. The classical computing system 950 may be configured for, based at least on a measurement of one or more ancillary qubits performed by the measurement device 940, determining at least one weight of a connection of the neural network.

A classical computing system may refer to a computing system operating with classical bits. A classical computing system may include a central processing unit (CPU) for processing information with classical bits and/or a memory for storing information with classical bits. A classical computing system may include one or more conventional computers and/or a network of conventional computers, such as personal computers (PCs).

An apparatus as described herein may include a controller. The controller may include or be a classical computing system as described herein. The controller may be connected to the quantum processing device, the encoding device and/or the measurement device. The controller may be configured for selecting, e.g. randomly selecting, a configuration from the training data set. The controller may be configured, for each configuration in the training data set, for at least one of:

instructing the encoding device to encode the configuration in input qubits that form a subset of the set of primary qubits, e.g. to bias the primary qubits associated with the first set of nodes towards a target state, wherein the target state encodes the configuration;

for each of the N rounds, instructing the quantum processing device to apply the sequence of unitary operators of the round in question to the quantum system, and instructing the measurement device to perform a measurement of at least a portion of the quantum system.

The controller may be configured for instructing the measurement device to perform a measurement of one or more ancillary qubits. The controller may be configured for determining at least one weight of a connection of the plurality of connections based at least on the measurement of the one or more ancillary qubits.

The encoding device may include a field generation device for applying one or more fields, e.g. magnetic fields, electric fields or laser fields, to at least a portion of the quantum system.

An apparatus as described herein may be configured for performing a method according to any of the embodiments described herein.

While the foregoing is directed to some embodiments of the invention, other and further embodiments may be devised without departing from the scope determined by the claims that follow.

The invention claimed is:

1. A method for machine learning using a quantum system, the method comprising:

providing a quantum system comprising a set of primary qubits and a set of ancillary qubits, wherein a neural network is associated with the quantum system, the neural network including:

a first set of nodes;

a second set of nodes;

a plurality of connections between the first set of nodes and the second set of nodes, each connection having a weight; and a training data set comprising a plurality of configurations for the first set of nodes, wherein each connection of the plurality of connections is both associated with a primary qubit and with an ancillary qubit, the method further comprising:

initializing the quantum system in an initial quantum state;

for each configuration of a number of configurations taken from the training data set, encoding the configuration in input qubits that form a subset of the set of primary qubits; and performing N rounds of operations, wherein each round comprises:

applying a sequence of unitary operators acting on at least a portion of the quantum system; and performing a measurement of at least a portion of the quantum system;

the method further comprising:

performing a measurement of one or more ancillary qubits; and based at least on the measurement of the one or more ancillary qubits, determining at least one weight of a connection of the plurality of connections.

2. The method of claim 1, wherein each ancillary qubit associated with a connection is configured for encoding the weight of the connection.

3. The method of claim 1, wherein each node of the first set of nodes is associated with a primary qubit, and wherein encoding the configuration in the input qubits includes biasing the primary qubits associated with the first set of nodes towards a target state, wherein the target state encodes the configuration.

4. The method of claim 3, wherein the primary qubits associated with the first set of nodes are biased towards the target state by applying one or more fields to at least a portion of the quantum system.

5. The method of claim 1, wherein the N rounds of operations include one or more adaptive rounds of operations, wherein, for each adaptive round of operations, the unitary operators of the sequence of unitary operators of the adaptive round are determined based on at least one measurement outcome of a measurement performed in a previous round of the N rounds of operations.

6. The method of claim 1, wherein each unitary operator in the sequence of unitary operators of each of the N rounds of operations is a short-range unitary operator.

7. The method of claim 1, wherein the measurement performed in each of the N rounds of operations is a measurement of a short-range Hamiltonian.

8. The method of claim 7, wherein the short-range Hamiltonian includes a first sum including a plurality of first summand Hamiltonians, wherein each first summand Hamiltonian acts at least on a primary qubit and an ancillary qubit.

9. The method of claim 7, wherein the short-range Hamiltonian includes a second sum including a plurality of second summand Hamiltonians, wherein each second summand Hamiltonian acts fully inside the set of primary qubits.

10. The method of claim 9, wherein the primary qubits are arranged according to at least a portion of a two-dimensional lattice, wherein each second summand Hamiltonian acts according to a plaquette of the two-dimensional lattice.

11. The method of claim 1, wherein performing the N rounds of operations includes:

performing a plurality of first rounds of operations, wherein each first round comprises:

(a1) applying a sequence of unitary operators selected from a first family of unitary operators to a portion of the quantum system, wherein at least some unitary operators of the first family of unitary operators act on the input qubits; and (a2) performing a measurement of at least a portion of the quantum system; and performing a plurality of second rounds of operations, wherein each second round comprises:

(b1) applying a sequence of unitary operators selected from a second family of unitary operators to a portion of the quantum system, wherein the second family of unitary operators is different from the first family of unitary operators, wherein at least some unitary operators of the second family of unitary operators act on the ancillary qubits; and (b2) performing a measurement of at least a portion of the quantum system.

12. The method of claim 11, wherein each unitary operator of the first family of unitary operators acts fully inside the set of primary qubits.

13. The method of claim 11, wherein the primary qubits are arranged according to at least a portion of a two-dimensional lattice, and wherein each unitary operator of the first family of unitary operators is a single-body unitary operator or a short-range unitary operator acting according to a plaquette of the two-dimensional lattice.

14. The method of claim 11, wherein at least some unitary operators of the second family of unitary operators act jointly on a primary qubit and an ancillary qubit.

15. The method of claim 11, wherein each unitary operator of the second family of unitary operators is a single-body unitary operator or is a two-body unitary operator acting on a primary qubit and an ancillary qubit.

16. The method of claim 1, wherein the primary qubits are arranged according to at least a portion of a first two-dimensional lattice and/or the ancillary qubits are arranged according to at least a portion of a second two-dimensional lattice.

17. A method for machine learning using a quantum system, the method comprising:

providing a quantum system comprising a set of primary qubits and a set of ancillary qubits, wherein a neural network is associated with the quantum system, the neural network including:

a first set of nodes;

a second set of nodes;

a plurality of connections between the first set of nodes and the second set of nodes, each connection having a weight;

a training data set comprising a plurality of configurations for the first set of nodes, wherein each connection of the plurality of connections is both associated with a primary qubit and with an ancillary qubit, the method further comprising:

initializing the quantum system in an initial quantum state;

for each configuration in a set sampled from the training data set, encoding the configuration in input qubits that form a subset of the set of primary qubits;

performing a plurality of first rounds of operations, wherein each first round comprises:

(a1) applying a sequence of unitary operators selected from a first family of unitary operators; and (a2) performing a measurement of at least a portion of the quantum system; and performing a plurality of second rounds of operations, wherein each second round comprises:

(b1) applying a sequence of unitary operators selected from a second family of unitary operators, wherein the second family of unitary operators is different from the first family of unitary operators; and (b2) performing a measurement of at least a portion of the quantum system;

the method further comprising:

performing a measurement of one or more ancillary qubits; and based at least on the measurement of the one or more ancillary qubits, determining at least one weight of a connection of the plurality of connections.

18. An apparatus for performing machine learning using a quantum system, the apparatus comprising:

a quantum system comprising a set of primary qubits and a set of ancillary qubits, wherein a neural network is associated with the quantum system, the neural network including:

a first set of nodes;

a second set of nodes;

a plurality of connections between the first set of nodes and the second set of nodes, each connection having a weight; and a training data set comprising a plurality of configurations for the first set of nodes, wherein each connection of the plurality of connections is both associated with a primary qubit and with an ancillary qubit;

a quantum processing device for evolving the quantum system according to one or more short-range unitary operators;

an encoding device for interacting with input qubits forming a subset of the set of primary qubits; and a measurement device for measuring at least a portion of the quantum system, wherein the apparatus is configured for:

initializing the quantum system in an initial quantum state;

for each configuration of a number of configurations taken from the training data set, encoding, by the encoding device, the configuration in the input qubits by interacting with the input qubits; and performing N rounds of operations, wherein each round comprises:

applying, by the quantum processing device, a sequence of unitary operators acting on at least a portion of the quantum system; and performing, by the measurement device, a measurement of at least a portion of the quantum system;

wherein the apparatus is further configured for:

performing, by the measurement device, a measurement of one or more ancillary qubits; and determining at least one weight of a connection of the plurality of connections based at least on the measurement of the one or more ancillary qubits.

19. The apparatus of claim 18, wherein the primary qubits are arranged according to at least a portion of a first two-dimensional lattice and/or wherein the ancillary qubits are arranged according to at least a portion of a second two-dimensional lattice.

20. The apparatus of claim 18, wherein the encoding device includes a field generation device for applying one or more fields to at least a portion of the quantum system.

21. The apparatus of claim 18, wherein the apparatus is configured for performing the method according to claim 1.

* * * * *